United States Patent
Shin et al.

(10) Patent No.: US 12,133,265 B2
(45) Date of Patent: Oct. 29, 2024

(54) METHOD AND DEVICE FOR TRANSMITTING/RECEIVING SIGNAL IN WIRELESS COMMUNICATION SYSTEM

(71) Applicant: LG Electronics Inc., Seoul (KR)

(72) Inventors: Seokmin Shin, Seoul (KR); Seonwook Kim, Seoul (KR); Suckchel Yang, Seoul (KR)

(73) Assignee: LG Electronics Inc., Seoul (KR)

( * ) Notice: Subject to any disclaimer, the term of this patent is extended or adjusted under 35 U.S.C. 154(b) by 352 days.

(21) Appl. No.: 17/774,692

(22) PCT Filed: Oct. 8, 2021

(86) PCT No.: PCT/KR2021/013854
§ 371 (c)(1),
(2) Date: May 5, 2022

(87) PCT Pub. No.: WO2022/075795
PCT Pub. Date: Apr. 14, 2022

(65) Prior Publication Data
US 2022/0408492 A1    Dec. 22, 2022

(30) Foreign Application Priority Data

Oct. 8, 2020  (KR) .......... 10-2020-0130367
Apr. 2, 2021  (KR) .......... 10-2021-0043521
Jun. 15, 2021  (KR) .......... 10-2021-0077202

(51) Int. Cl.
*H04W 4/00* (2018.01)
*H04W 16/14* (2009.01)
(Continued)

(52) U.S. Cl.
CPC ....... *H04W 74/0833* (2013.01); *H04W 16/14* (2013.01); *H04W 72/0446* (2013.01)

(58) Field of Classification Search
CPC ............. H04W 74/0833; H04W 16/14; H04W 72/0446; H04W 74/004; H04W 74/006;
(Continued)

(56) References Cited

U.S. PATENT DOCUMENTS

2019/0037509 A1* 1/2019 Li .................. H04W 56/001
2019/0306832 A1* 10/2019 Si .................. H04L 27/2666
(Continued)

FOREIGN PATENT DOCUMENTS

KR    20200087230    7/2020

OTHER PUBLICATIONS

3GPP, "3rd Generation Partnership Project; Technical Specification Group Radio Access Network; NR; Physical channels and modulation (Release 16)," TS 38.211 V16.3.0, Sep. 2020, 133 pages.
(Continued)

*Primary Examiner* — Phuongchau Ba Nguyen
(74) *Attorney, Agent, or Firm* — Fish & Richardson P.C.

(57) ABSTRACT

A method and a device for transmitting/receiving a signal in a wireless communication system, according to one embodiment of the present disclosure, comprise transmitting a PRACH, and receiving an RAR on the basis of the PRACH. The PRACH is transmitted within one or two PRACH slots. The one or two PRACH slots are determined from among N number of slots corresponding to reference slots. 60 kHz SCS can be applied to the reference slots on the basis of the application of one from among 480 kHz SCS and 960 kHz SCS to the N number of slots.

16 Claims, 35 Drawing Sheets

(51) Int. Cl.
*H04W 72/0446* (2023.01)
*H04W 74/0833* (2024.01)

(58) Field of Classification Search
CPC ... H04W 28/04; H04W 72/04; H04W 72/042; H04W 88/08; H04W 28/08; H04W 28/084; H04W 36/22; H04W 72/12; H04L 5/0053; H04L 27/26; H04L 27/26025; H04L 5/0007
See application file for complete search history.

(56) References Cited

U.S. PATENT DOCUMENTS

| | | | |
|---|---|---|---|
| 2019/0387546 | A1 | 12/2019 | Li et al. |
| 2020/0053781 | A1* | 2/2020 | Pan ................. H04W 72/30 |
| 2020/0187268 | A1 | 6/2020 | Huang et al. |
| 2020/0221506 | A1* | 7/2020 | Jeon ................. H04W 74/0833 |
| 2020/0267764 | A1* | 8/2020 | Rastegardoost ...... H04W 76/27 |
| 2021/0314938 | A1* | 10/2021 | Kim ................. H04L 5/001 |
| 2022/0191936 | A1* | 6/2022 | Shin ................. H04W 74/0833 |
| 2022/0256589 | A1* | 8/2022 | Sakhnini ............ H04W 74/0833 |
| 2022/0264493 | A1* | 8/2022 | Harada ................. H04W 48/10 |
| 2022/0286987 | A1* | 9/2022 | Kurita ............... H04W 56/0015 |
| 2022/0360353 | A1* | 11/2022 | Pajukoski ............. H04L 5/0007 |
| 2023/0142830 | A1* | 5/2023 | Myung ................. H04L 5/0094 370/329 |
| 2023/0336386 | A1* | 10/2023 | Kurita ............... H04L 27/26025 |

OTHER PUBLICATIONS

International Search Report in International Appln. No. PCT/KR2021/013854, dated Feb. 3, 2022, 6 pages (with English translation).

Syed, "NR RACH Process is similar to LTE, and there are two categories for NR Random access procedure," LTE/SG Wireless Systems Engineer, 11 pages.

* cited by examiner

FIG. 4
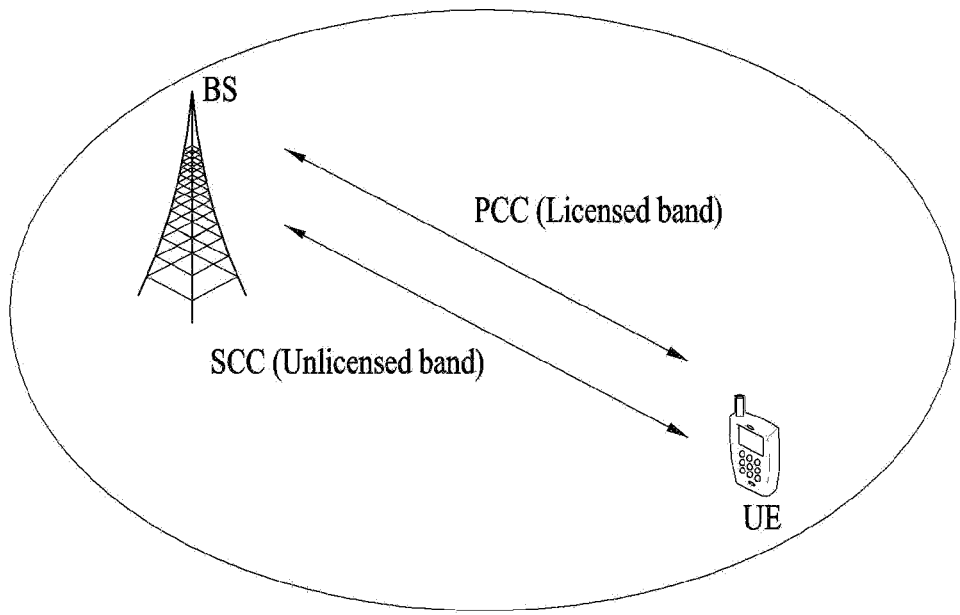
(a) Carrier aggregation between L-band and U-band
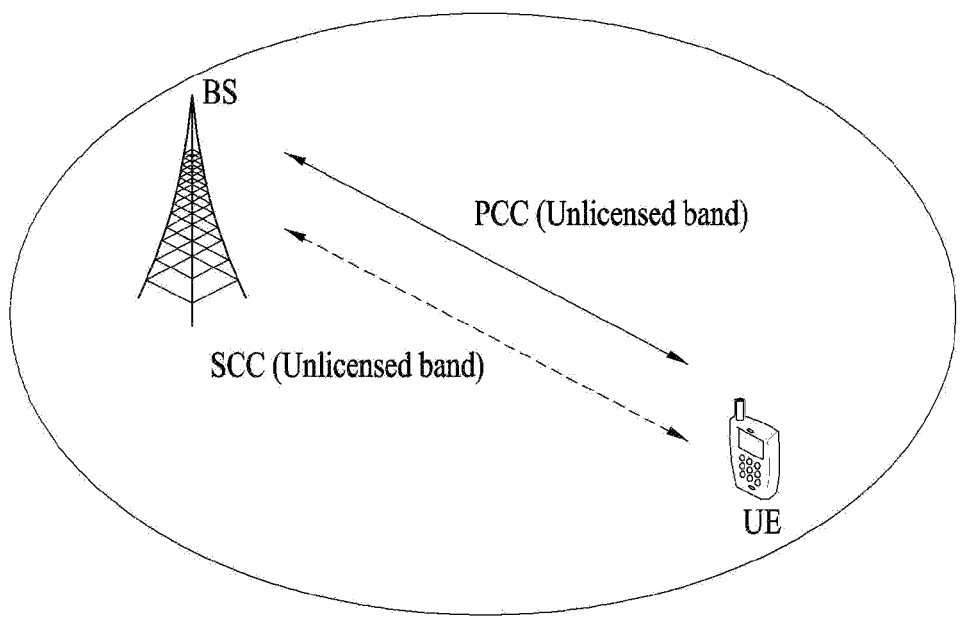
(b) Standalone U-band(s)

FIG. 8
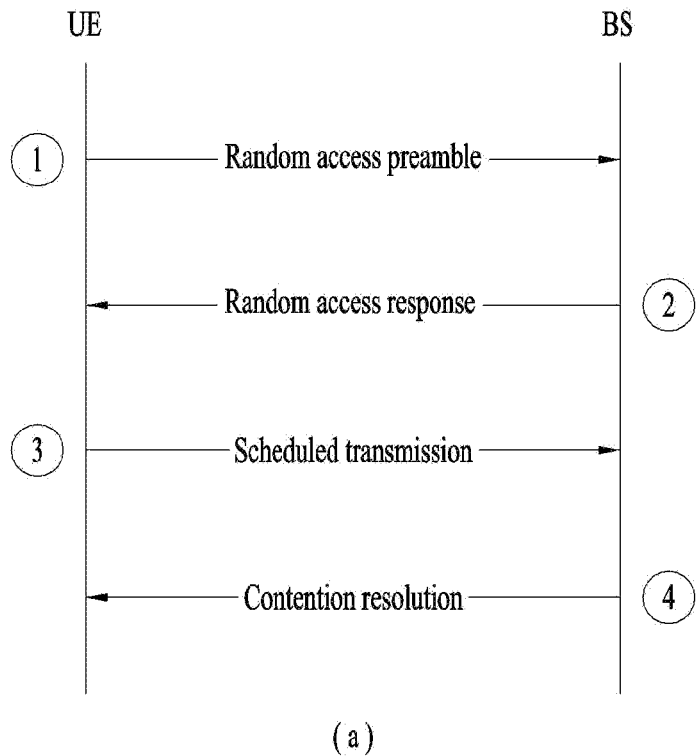
(a)
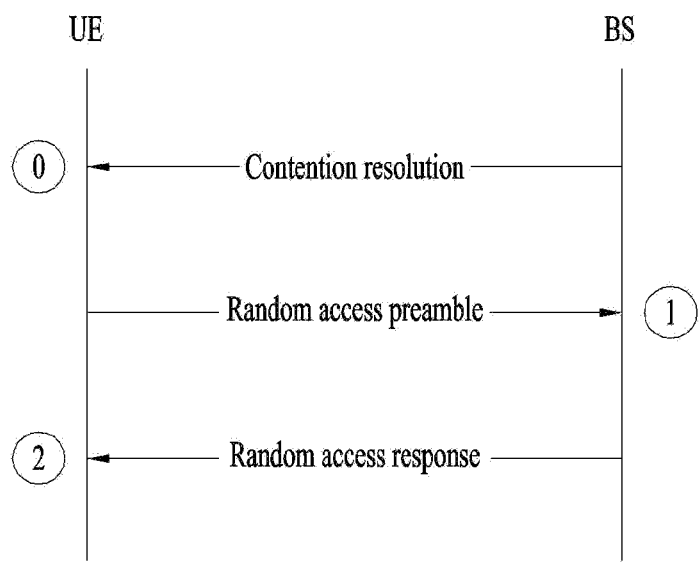
(b)

FIG. 9
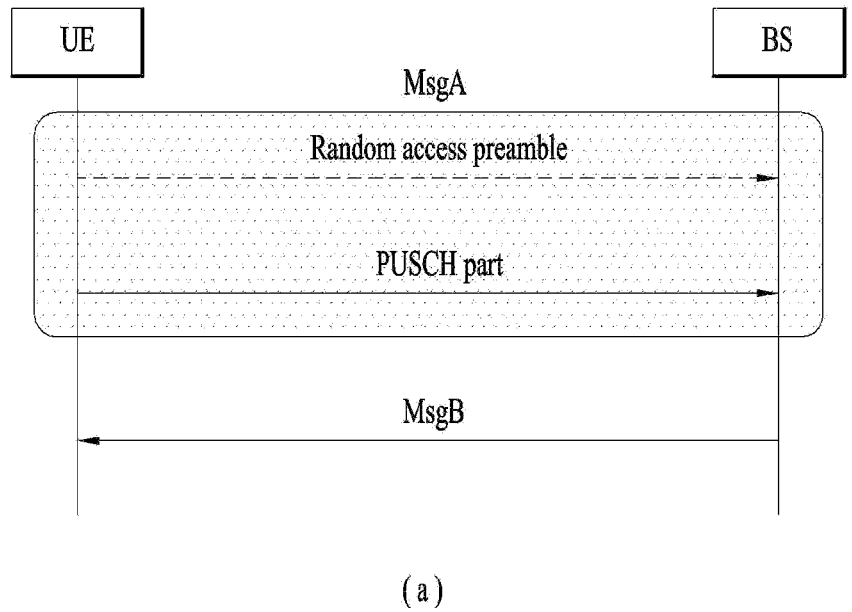
(a)
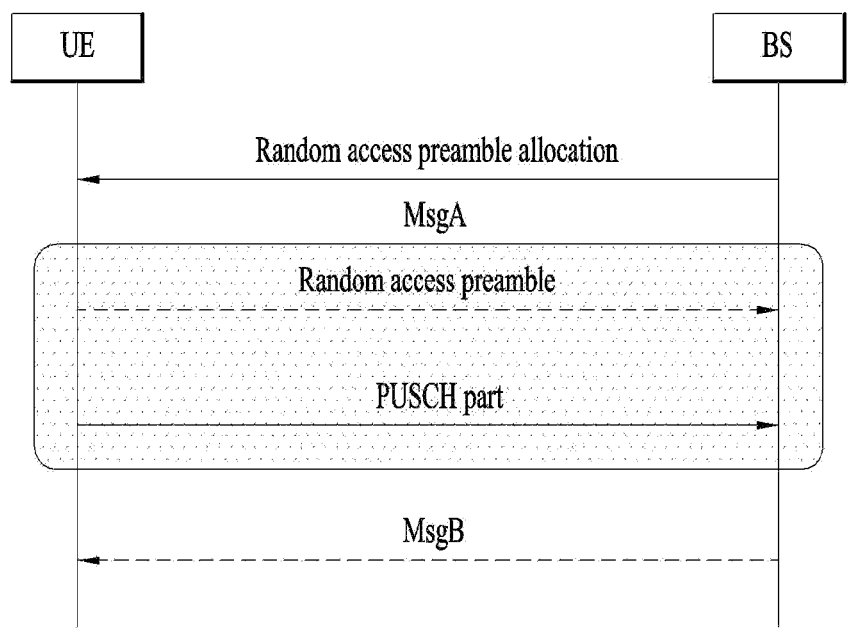
(b)

FIG. 11

The starting position $t_{\text{start}}^{\text{RA}}$ of the PRACH preamble in a subframe (for $\Delta f_{\text{RA}} \in \{1.25, 5, 15, 30\}$ kHz) or in a 60 kHz slot (for $\Delta f_{\text{RA}} \in \{60, 120\}$ kHz) is given by $$t_{\text{start}}^{\text{RA}} = t_{\text{start},l}^{\mu}$$

$$t_{\text{start},l}^{\mu} = \begin{cases} 0 & l = 0 \\ t_{\text{start},l-1}^{\mu} + \left(N_u^{\mu} + N_{\text{CP},l-1}^{\mu}\right) \cdot T_c & \text{otherwise} \end{cases}$$

where

- the subframe or 60 kHz slot is assumed to start at $t = 0$;
- a timing advance value $N_{\text{TA}} = 0$ shall be assumed;
- $N_u^{\mu}$ and $N_{\text{CP},l-1}^{\mu}$ are given by clause 5.3.1;
- $\mu = 0$ shall be assumed for $\Delta f_{\text{RA}} \in \{1.25, 5\}$ kHz, otherwise it is given by $\Delta f_{\text{RA}} \in \{15, 30, 60, 120\}$ kHz and the symbol position $l$ is given by $$l = l_0 + n_t^{\text{RA}} N_{\text{dur}}^{\text{RA}} + 14 n_{\text{slot}}^{\text{RA}}$$

where

- $l_0$ is given by the parameter "starting symbol" in Tables 6.3.3.2-2 to 6.3.3.2-4;

- $n_t^{\text{RA}}$ is the PRACH transmission occasion within the PRACH slot, numbered in increasing order from 0 to $N_t^{\text{RA,slot}} - 1$ within a RACH slot where $N_t^{\text{RA,slot}}$ is given Tables 6.3.3.2-2 to 6.3.3.2-4 for $L_{\text{RA}} \in \{139, 571, 1151\}$ and fixed to 1 for $L_{\text{RA}} = 839$;

- $N_{\text{dur}}^{\text{RA}}$ is given by Tables 6.3.3.2-2 to 6.3.3.2-4;

- $n_{\text{slot}}^{\text{RA}}$ is given by

- if $\Delta f_{\text{RA}} \in \{1.25, 5, 15, 60\}$ kHz, then $n_{\text{slot}}^{\text{RA}} = 0$

- if $\Delta f_{\text{RA}} \in \{30, 120\}$ kHz and either of "Number of PRACH slots within a subframe" in Tables 6.3.3.2-2 to 6.3.3.2-3 or "Number of PRACH slots within a 60 kHz slot" in Table 6.3.3.2-4 is equal to 1, then $n_{\text{slot}}^{\text{RA}} = 1$

- otherwise, $n_{\text{slot}}^{\text{RA}} \in \{0, 1\}$

FIG. 14

| PRACH Config. Index | Preamble format | $n_{SFN} \bmod \chi = y$ | | Slot number | Starting symbol | Number of PRACH slots within a 60 kHz slot | $N_t^{RA,slot}$, number of time-domain PRACH occasions within a PRACH slot | $N_{dur}^{RA}$, RPACH duration |
|---|---|---|---|---|---|---|---|---|
| 17 | A1 | 1 | 0 | 9,19,29,39 | 0 | 2 | 6 | 2 |

FIG. 22

| PRACH Config. Index | Preamble format | $n_{SFN}$ mod $\chi = y$ | | Slot number | Starting symbol | Number of PRACH slots within a 60 kHz slot | $N_t^{RA,slot}$, number of time-domain PRACH occasions within a PRACH slot | $N_{dur}^{RA}$, RPACH duration |
|---|---|---|---|---|---|---|---|---|
| | | $\chi$ | $y$ | | | | | |
| 70 | A3 | 1 | 0 | 19,39 | 7 | 1 | 1 | 6 |

FIG. 33

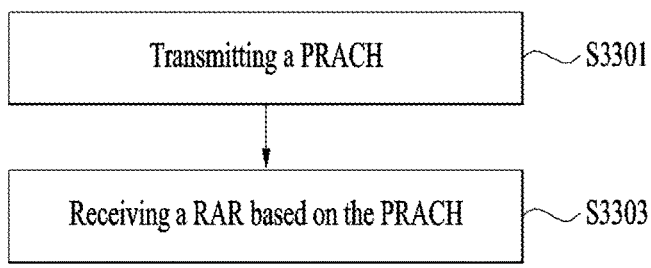

FIG. 34

- $n_{slot}^{RA}$ is given by
  - if $\Delta f_{RA} \in \{480\}$ kHz and
    - if either of "Number of PRACH slots within a subframe" in Tables 6.3.3.2-2 to 6.3.3.2-3 or "Number of PRACH slots within a 60 kHz slot" in Table 6.3.3.2-4 is equal to 1, then $n_{slot}^{RA} = 7$
      - otherwise, $n_{slot}^{RA} \in \{3,7\}$
  - if $\Delta f_{RA} \in \{960\}$ kHz and
    - if either of "Number of PRACH slots within a subframe" in Tables 6.3.3.2-2 to 6.3.3.2-3 or "Number of PRACH slots within a 60 kHz slot" in Table 6.3.3.2-4 is equal to 1, then $n_{slot}^{RA} = 15$
      - otherwise, $n_{slot}^{RA} \in \{7,15\}$

FIG. 35

- $n_{slot}^{RA}$ is given by

- if $\Delta f_{RA} \in \{480\}$ kHz and

- if either of "Number of PRACH slots within a subframe" in Tables 6.3.3.2-2 to 6.3.3.2-3 or "Number of PRACH slots within a 60 kHz slot" in Table 6.3.3.2-4 is equal to 1, then $n_{slot}^{RA} = 7$

- otherwise, $n_{slot}^{RA} \in \{6,7\}$

- if $\Delta f_{RA} \in \{960\}$ kHz and

- if either of "Number of PRACH slots within a subframe" in Tables 6.3.3.2-2 to 6.3.3.2-3 or "Number of PRACH slots within a 60 kHz slot" in Table 6.3.3.2-4 is equal to 1, then $n_{slot}^{RA} = 15$

- otherwise, $n_{slot}^{RA} \in \{14,15\}$

FIG. 36

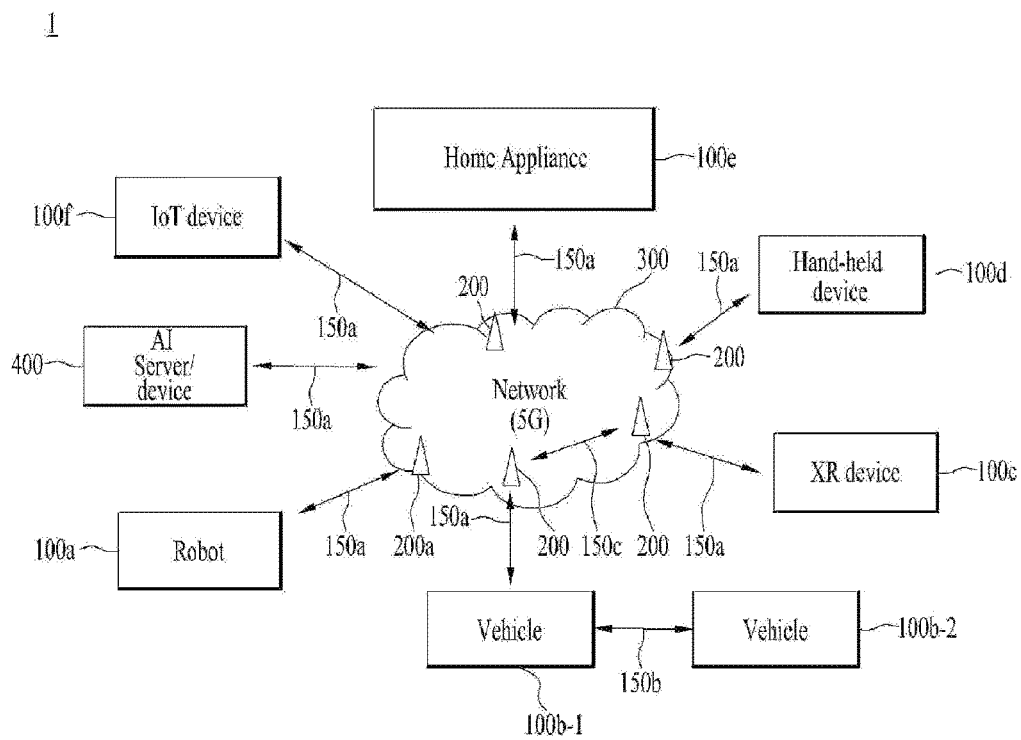

METHOD AND DEVICE FOR TRANSMITTING/RECEIVING SIGNAL IN WIRELESS COMMUNICATION SYSTEM

CROSS-REFERENCE TO RELATED APPLICATIONS

This application is a National Stage application under 35 U.S.C. § 371 of International Application No. PCT/KR2021/013854, filed on Oct. 8, 2021, which claims the benefit of Korean Application Nos. 10-2021-0077202, filed on Jun. 15, 2021, 10-2021-0043521, filed on Apr. 2, 2021, and 10-2020-0130367, filed on Oct. 8, 2020. The disclosures of the prior applications are hereby incorporated by reference herein in their entirety.

TECHNICAL FIELD

The present disclosure relates to a method and apparatus used in a wireless communication system. Specifically, the present disclosure relates to a random access method and apparatus used in a wireless communication system.

BACKGROUND ART

Generally, a wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may include one of code division multiple access (CDMA) system, frequency division multiple access (FDMA) system, time division multiple access (TDMA) system, orthogonal frequency division multiple access (OFDMA) system, single carrier frequency division multiple access (SC-FDMA) system, and the like.

DISCLOSURE

Technical Problem

The object of the present disclosure is to provide a method and apparatus for performing a random access procedure efficiently in a wireless communication system.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

The present disclosure provides a method and apparatus for transmitting and receiving a signal in a wireless communication system.

In one aspect of the present disclosure, provided herein is a method of transmitting and receiving a signal by a user equipment (UE) operating in a wireless communication system, the method including transmitting a physical random access channel (PRACH), and receiving a random access response (RAR) based on the PRACH, wherein the PRACH is transmitted in one or two PRACH slots, wherein the one or two PRACH slots are determined among N slots corresponding to a reference slot, wherein, based on one of 480 kHz subcarrier spacing (SCS) and 960 kHz SCS being used for the N slots, 60 kHz SCS is used for the reference slot.

In another aspect of the present disclosure, provided herein is a method of transmitting and receiving a signal by a base station (BS) operating in a wireless communication system, the method including receiving a physical random access channel (PRACH), and transmitting a random access response (RAR) based on the PRACH, wherein the PRACH is transmitted in one or two PRACH slots, wherein the one or two PRACH slots are determined among N slots corresponding to a reference slot, wherein, based on one of 480 kHz subcarrier spacing (SCS) and 960 kHz SCS being used for the N slots, 60 kHz SCS is used for the reference slot.

In another aspect of the present disclosure, provided herein are a device, a processor, and a storage medium for performing the signal transmission/reception methods.

In the methods and devices, based on a number of PRACH slots in the reference slot being 1, a value for the one PRACH slot may be N−1.

In the methods and devices, based on a number of PRACH slots in the reference slot not being 1, values for the two PRACH slots may be N/2−1 and N−1.

In the methods and devices, based on a number of PRACH slots in the reference slot not being 1, values for the two PRACH slots may be N−1 and N−2.

The communication apparatus may include an autonomous driving vehicle communicable with at least a UE, a network, and another autonomous driving vehicle other than the communication apparatus.

The above-described aspects of the present disclosure are only some of the preferred embodiments of the present disclosure, and various embodiments reflecting the technical features of the present disclosure may be derived and understood from the following detailed description of the present disclosure by those skilled in the art.

Advantageous Effects

According to an embodiment of the present disclosure, a communication apparatus may perform a random access procedure more efficiently in a different way from the prior art.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

DESCRIPTION OF DRAWINGS

FIG. 4 illustrates a wireless communication system supporting an unlicensed band.

FIGS. 8 and 9 are a diagram illustrating a signal flow for a random access procedure;

FIGS. 11 to 35 are diagrams illustrating uplink (UL) channel transmission according to the embodiments of the present disclosure.

FIGS. 36 to 39 illustrate devices according to an embodiment of the present disclosure.

BEST MODE

The following technology may be used in various wireless access systems such as code division multiple access (CDMA), frequency division multiple access (FDMA), time division multiple access (TDMA), orthogonal frequency division multiple access (OFDMA), single carrier frequency division multiple access (SC-FDMA), and so on. CDMA may be implemented as a radio technology such as universal terrestrial radio access (UTRA) or CDMA2000. TDMA may be implemented as a radio technology such as global system for mobile communications (GSM)/general packet radio service (GPRS)/enhanced data rates for GSM evolution (EDGE). OFDMA may be implemented as a radio technology such as institute of electrical and electronics engineers (IEEE) 802.11 (wireless fidelity (Wi-Fi)), IEEE 802.16 (worldwide interoperability for microwave access (WiMAX)), IEEE 802.20, evolved UTRA (E-UTRA), and so on. UTRA is a part of universal mobile telecommunications system (UMTS). 3rd generation partnership project (3GPP) long term evolution (LTE) is a part of evolved UMTS (E-UMTS) using E-UTRA, and LTE-advanced (LTE-A) is an evolution of 3GPP LTE. 3GPP new radio or new radio access technology (NR) is an evolved version of 3GPP LTE/LTE-A.

For clarity of description, the present disclosure will be described in the context of a 3GPP communication system (e.g., LTE and NR), which should not be construed as limiting the spirit of the present disclosure. LTE refers to a technology beyond 3GPP TS 36.xxx Release 8. Specifically, the LTE technology beyond 3GPP TS 36.xxx Release 10 is called LTE-A, and the LTE technology beyond 3GPP TS 36.xxx Release 13 is called LTE-A pro. 3GPP NR is the technology beyond 3GPP TS 38.xxx Release 15. LTE/NR may be referred to as a 3GPP system. "xxx" specifies a technical specification number. LTE/NR may be generically referred to as a 3GPP system. For the background technology, terminologies, abbreviations, and so on as used herein, refer to technical specifications published before the present disclosure. For example, the following documents may be referred to.

3GPP LTE
36.211: Physical channels and modulation
36.212: Multiplexing and channel coding
36.213: Physical layer procedures
36.300: Overall description
36.331: Radio Resource Control (RRC)

Figure 1:
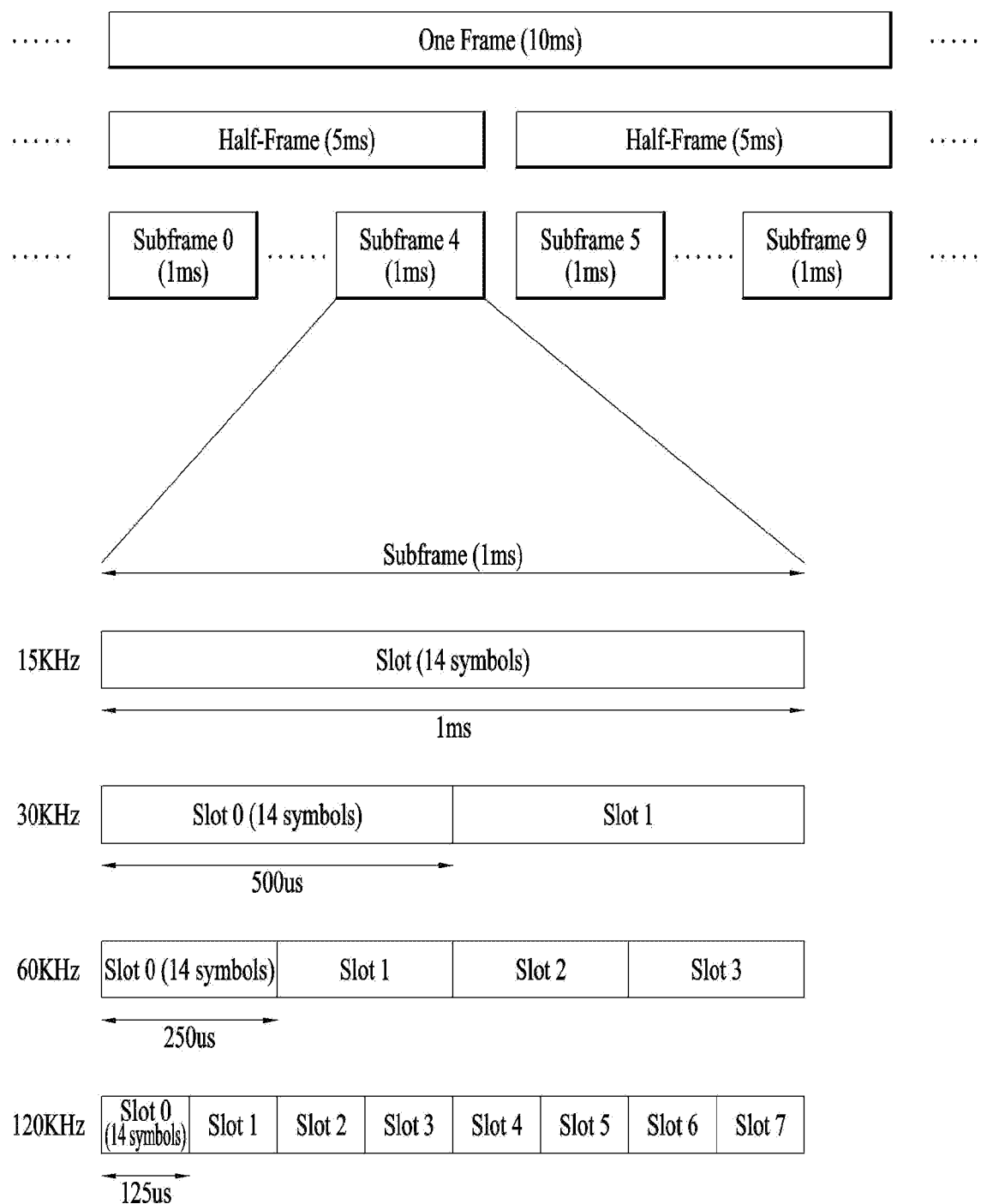
FIG. 1 illustrates a radio frame structure.

3GPP NR
38.211: Physical channels and modulation
38.212: Multiplexing and channel coding
38.213: Physical layer procedures for control
38.214: Physical layer procedures for data
38.300: NR and NG-RAN Overall Description
38.331: Radio Resource Control (RRC) protocol specification FIG. 1 illustrates a radio frame structure used for NR.

In NR, UL and DL transmissions are configured in frames. Each radio frame has a length of 10 ms and is divided into two 5-ms half-frames. Each half-frame is divided into five 1-ms subframes. A subframe is divided into one or more slots, and the number of slots in a subframe depends on a subcarrier spacing (SCS). Each slot includes 12 or 14 OFDM(A) symbols according to a cyclic prefix (CP). When a normal CP is used, each slot includes 14 OFDM symbols. When an extended CP is used, each slot includes 12 OFDM symbols. A symbol may include an OFDM symbol (or a CP-OFDM symbol) and an SC-FDMA symbol (or a discrete Fourier transform-spread-OFDM (DFT-s-OFDM) symbol).

Table 1 exemplarily illustrates that the number of symbols per slot, the number of slots per frame, and the number of slots per subframe vary according to SCSs in a normal CP case.

TABLE 1

| SCS ($15*2^u$) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

* $N^{slot}_{symb}$: number of symbols in a slot
* $N^{frame, u}_{slot}$: number of slots in a frame
* $N^{subframe, u}_{slot}$: number of slots in a subframe Table 2 illustrates that the number of symbols per slot, the number of slots per frame, and the number of slots per subframe vary according to SCSs in an extended CP case.

TABLE 2

| SCS ($15*2^u$) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

In the NR system, different OFDM(A) numerologies (e.g., SCSs, CP lengths, and so on) may be configured for a plurality of cells aggregated for one UE. Accordingly, the (absolute time) duration of a time resource (e.g., a subframe, a slot, or a transmission time interval (TTI)) (for convenience, referred to as a time unit (TU)) composed of the same number of symbols may be configured differently between the aggregated cells.

Figure 2:
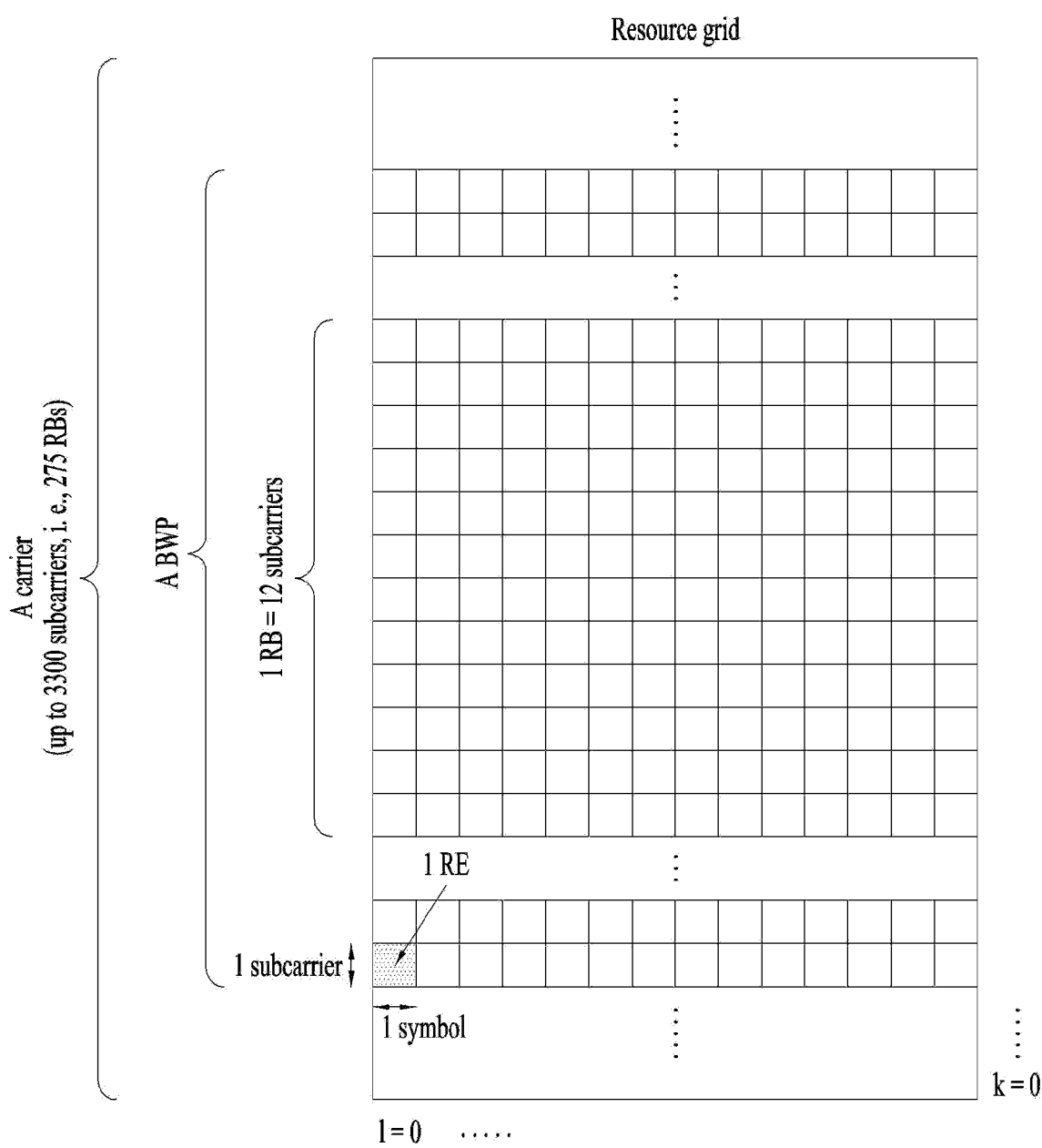
FIG. 2 illustrates a resource grid during the duration of a slot.

FIG. 2 illustrates a resource grid during the duration of one slot.

A slot includes a plurality of symbols in the time domain. For example, one slot includes 14 symbols in a normal CP case and 12 symbols in an extended CP case. A carrier includes a plurality of subcarriers in the frequency domain. A resource block (RB) may be defined by a plurality of (e.g., 12) consecutive subcarriers in the frequency domain. A plurality of RB interlaces (simply, interlaces) may be defined in the frequency domain. Interlace m∈{0, 1, . . . M−1} may be composed of (common) RBs {m, M+m, 2M+m, 3M+m, . . . }. M denotes the number of interlaces. A bandwidth part (BWP) may be defined by a plurality of consecutive (physical) RBs ((P)RBs) in the frequency domain and correspond to one numerology (e.g., SCS, CP length, and so on). A carrier may include up to N (e.g., 5) BWPs. Data communication may be conducted in an active BWP, and only one BWP may be activated for one UE. Each element in a resource grid may be referred to as a resource element (RE), to which one complex symbol may be mapped.

Figure 3:
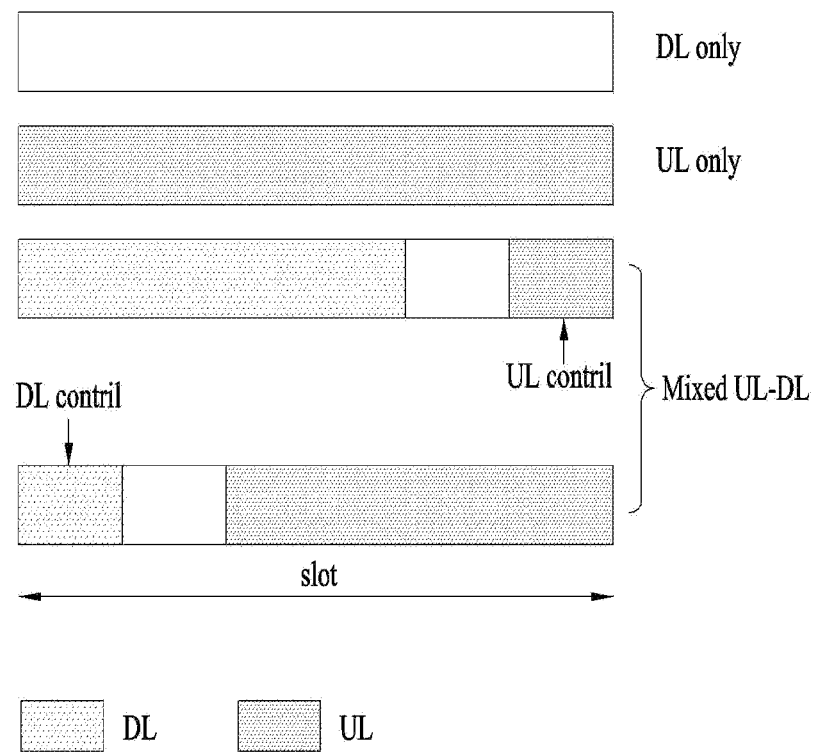
FIG. 3 illustrates a self-contained slot structure.

FIG. 3 illustrates a structure of a self-contained slot.

In the NR system, a frame has a self-contained structure in which a DL control channel, DL or UL data, a UL control channel, and the like may all be contained in one slot. For example, the first N symbols (hereinafter, DL control region)

in the slot may be used to transmit a DL control channel, and the last M symbols (hereinafter, UL control region) in the slot may be used to transmit a UL control channel. N and M are integers greater than or equal to 0. A resource region (hereinafter, a data region) that is between the DL control region and the UL control region may be used for DL data transmission or UL data transmission. For example, the following configuration may be considered. Respective sections are listed in a temporal order.

1. DL only configuration
2. UL only configuration
3. Mixed UL-DL configuration
   DL region+Guard period (GP)+UL control region
   DL control region+GP+UL region
   DL region: (i) DL data region, (ii) DL control region+DL data region
   UL region: (i) UL data region, (ii) UL data region+UL control region The PDCCH may be transmitted in the DL control region, and the PDSCH may be transmitted in the DL data region. The PUCCH may be transmitted in the UL control region, and the PUSCH may be transmitted in the UL data region. The GP provides a time gap in the process of the UE switching from the transmission mode to the reception mode or from the reception mode to the transmission mode. Some symbols at the time of switching from DL to UL within a subframe may be configured as the GP.

In the present disclosure, a base station (BS) may be, for example, a gNode B (gNB).

1. Wireless Communication System Supporting Unlicensed Band

FIG. 4 illustrates an exemplary wireless communication system supporting an unlicensed band applicable to the present disclosure.

In the following description, a cell operating in a licensed band (L-band) is defined as an L-cell, and a carrier of the L-cell is defined as a (DL/UL) LCC. A cell operating in an unlicensed band (U-band) is defined as a U-cell, and a carrier of the U-cell is defined as a (DL/UL) UCC.

The carrier/carrier-frequency of a cell may refer to the operating frequency (e.g., center frequency) of the cell. A cell/carrier (e.g., CC) is commonly called a cell.

When a UE and a BS transmit and receive signals in a carrier-aggregated LCC and UCC as illustrated in FIG. 4(a), the LCC may be configured as a primary CC (PCC) and the UCC may be configured as a secondary CC (SCC). As illustrated in FIG. 4(b), the UE and the BS may transmit and receive signals in one UCC or a plurality of carrier-aggregated UCCs. That is, the UE and the BS may transmit and receive signals only in UCC(s) without an LCC.

Unless otherwise specified), a signal transmission/reception operation in an unlicensed band described in the present disclosure may be performed based on all the above-described deployment scenarios.

Radio Frame Structure for Unlicensed Band

Recently, the 3GPP standardization group has proceeded to standardize a 5G wireless communication system named new RAT (NR). The 3GPP NR system has been designed to provide a plurality of logical networks in a single physical system and support services with various requirements (e.g., eMBB, mMTC, URLLC, etc.) by changing a transmission time interval (TTI) and/or an OFDM numerology (e.g., OFDM symbol duration, SCS, etc.). In recent years, data traffic has significantly increased with the advent of smart devices. Thus, the 3GPP NR system has also considered the use of an unlicensed band for cellular communication as in License-Assisted Access (LAA) of the legacy 3GPP LTE system. However, unlike the LAA, a NR cell in the unlicensed-band (NR U-cell) aims to support standalone operation. For example, PUCCH, PUSCH, and/or PRACH transmission may be supported in the NR UCell.

The NR frame structure of FIG. 1 may be used for an operation in an unlicensed band. The configuration of OFDM symbols occupied for UL/DL signal transmission in the frame structure for the unlicensed band may be configured by the BS. The term OFDM symbol may be replaced with SC-FDM(A) symbol.

In the following description, a plurality of CCs (CC indexes) may be replaced with a plurality of BWPs (BWP indexes) configured in one (or more) CC(s) or (serving) cell(s), or a plurality of CCs/cells each including a plurality of BWPs (i.e., CC (index)-BWP (index) combinations). In this situation, the proposed principle/operations of the present disclosure are also applicable in the same manner.

Figure 5:
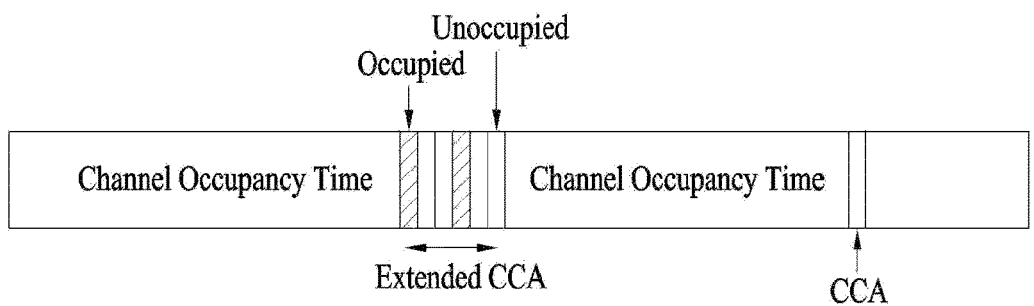
FIG. 5 illustrates an exemplary method of occupying resources in an unlicensed band.

FIG. 5 illustrates an exemplary method of occupying resources in an unlicensed band. According to regional regulations for the U-band, a communication node in the U-band needs to determine whether a corresponding channel is used by other communication node(s) before transmitting a signal. Specifically, the communication node may perform carrier sensing (CS) before transmitting the signal so as to check whether the other communication node(s) perform signal transmission. When the other communication node(s) perform no signal transmission, it is said that clear channel assessment (CCA) is confirmed. When a CCA threshold is predefined or configured by higher layer signaling (e.g., RRC signaling), if the detected channel energy is higher than the CCA threshold, the communication node may determine that the channel is busy. Otherwise, the communication node may determine that the channel is idle. When it is determined that the channel is idle, the communication node may start the signal transmission in the UCell. The Wi-Fi standard (802.11 ac) specifies a CCA threshold of 62 dBm for non-Wi-Fi signals and a CCA threshold of −82 dBm for Wi-Fi signals. The sires of processes described above may be referred to as Listen-Before-Talk (LBT) or a channel access procedure (CAP). The LBT may be interchangeably used with the CAP or CCA.

Specifically, for DL reception/UL transmission in an unlicensed band, one or more of the following channel access procedure (CAP) methods may be used in a wireless communication system related to the present disclosure.

Method of Transmitting DL Signal in Unlicensed Band

To transmit a DL signal in an unlicensed band, the BS may indicate the configuration of OFDM symbols used in subframe #n to the UE by signaling. The term subframe may be replaced with slot or time unit (TU).

The BS may perform one of the following unlicensed band access procedures (e.g., CAPs) to transmit a DL signal in the unlicensed band.

(1) First DL CAP Method

Figure 6:
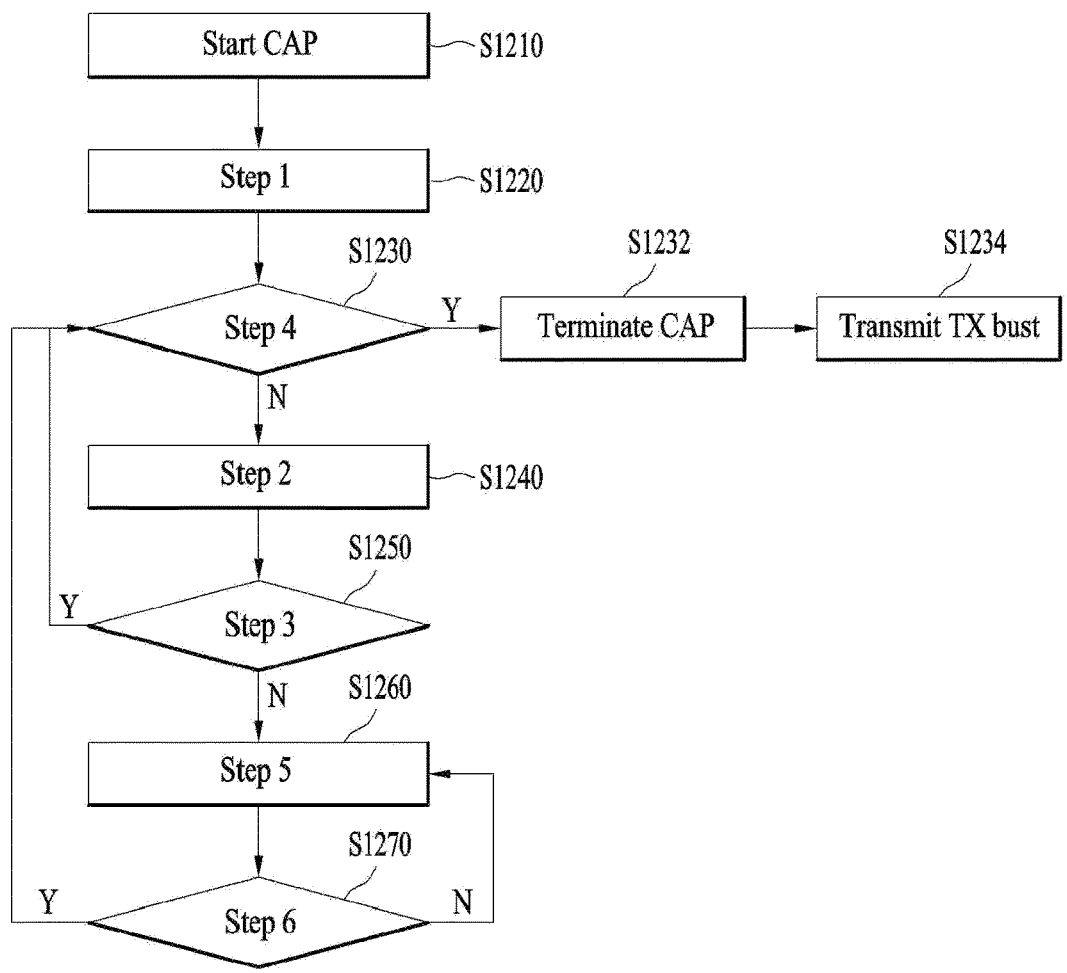
FIGS. 6 and 7 are flowcharts illustrating channel access procedures (CAPs) for signal transmission in an unlicensed band.

FIG. 6 is a flowchart illustrating a DL CAP for DL signal transmission in an unlicensed band, performed by a BS.

For DL signal transmission (e.g., transmission of a DL signal such as a PDSCH/PDCCH/enhanced PDCCH (EPDCCH)), the BS may initiate a CAP (S1210). The BS may randomly select a backoff counter N within a contention window (CW) according to step 1. N is set to an initial value $N_{init}$ (S1220). $N_{init}$ is a random value selected from the values between 0 and $CW_p$. Subsequently, when the backoff counter value N is 0 according to step 4 (S1230; Y), the BS terminates the CAP (S1232). The BS may then perform a Tx burst transmission including transmission of a PDSCH/PDCCH/EPDCCH (S1234). On the contrary, when the backoff counter value N is not 0 (S1230; N), the BS decrements the backoff counter value by 1 according to step 2 (S1240). Subsequently, the BS checks whether the channel of U-cell(s) is idle (S1250). If the channel is idle (S1250; Y), the BS determines whether the backoff counter value is 0 (S1230). On the contrary, when the channel is not idle, that is, the channel is busy (S1250; N), the BS determines whether the channel is idle during a longer defer duration Td (25 usec or longer) than a slot duration (e.g., 9 usec) according to step 5 (S1260). If the channel is idle during the defer duration (S1270; Y), the BS may resume the CAP. The defer duration may include a 16-usec duration and the immediately following $m_p$ consecutive slot durations (e.g., each being 9 usec). On the contrary, if the channel is busy during the defer duration (S1270; N), the BS re-checks whether the channel of the U-cell(s) is idle during a new defer duration by performing step S1260 again.

Table 3 illustrates that mp, a minimum CW, a maximum CW, a maximum channel occupancy time (MCOT), and an allowed CW size applied to a CAP vary according to channel access priority classes.

TABLE 3

| Channel Access Priority Class (p) | $m_p$ | $CW_{min, p}$ | $CW_{max, p}$ | $T_{mcotp}$ | allowed $CW_p$ sizes |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

A CW size applied to the first DL CAP may be determined in various methods. For example, the CW size may be adjusted based on the probability of HARQ-ACK values corresponding to PDSCH transmission(s) within a predetermined time period (e.g., a reference TU) being determined as NACK. In the case where the BS performs a DL transmission including a PDSCH that is associated with a channel access priority class p on a carrier, if the probability z of HARQ-ACK values corresponding to PDSCH transmission(s) in reference subframe k (or reference slot k) being determined as NACK is at least 80%, the BS increases a CW value set for each priority class to the next higher allowed value. Alternatively, the BS maintains the CW value set for each priority class to be an initial value. A reference subframe (or reference slot) may be defined as the starting subframe (or slot) of the most recent transmission on the carrier made by the BS, for which at least some HARQ-ACK feedback is expected to be available.

(2) Second DL CAP Method

The BS may perform a DL signal transmission (e.g., a signal transmission including a discovery signal transmission, without a PDSCH) in an unlicensed band according to the second DL CAP method described below.

When the signal transmission duration of the BS is equal to or less than 1 ms, the BS may transmit a DL signal (e.g., a signal including a discovery signal without a PDSCH) in the unlicensed band immediately after sensing the channel to be idle for at least a sensing duration $T_{drs}$=25 us. Tars includes a duration $T_f$ (=16 us) following one sensing slot duration $T_{sl}$ (=9 us).

(3) Third DL CAP Method

The BS may perform the following CAPs for DL signal transmission on multiple carriers in an unlicensed band.

1) Type A: The BS performs a CAP for multiple carriers based on a counter N defined for each carrier (a counter N considered in a CAP) and performs a DL signal transmission based on the CAP.

Type A1: The counter N for each carrier is determined independently, and a DL signal is transmitted on each carrier based on the counter N for the carrier.

Type A2: The counter N of a carrier with a largest CW size is set for each carrier, and a DL signal is transmitted on each carrier based on the counter N for the carrier.

2) Type B: The BS performs a CAP based on a counter N only for a specific one of a plurality of carriers and performs a DL signal transmission by checking whether the channels of the other carriers are idle before a signal transmission on the specific carrier.

Type B1: A single CW size is defined for a plurality of carriers, and the BS uses the single CW size in a CAP based on the counter N for a specific carrier.

Type B2: A CW size is defined for each carrier, and the largest of the CW sizes is used in determining $N_{init}$ for a specific carrier.

Method of Transmitting UL Signal in Unlicensed Band

For a UL signal transmission in an unlicensed band, the BS may transmit information about a UL transmission period to the UE by signaling.

For a UL signal transmission in the unlicensed band, the UE performs a contention-based CAP. For example, the UE may perform a Type 1 CAP or a Type 2 CAP for UL signal transmission in the U-band. In general, the UE may perform a CAP configured/indicated by the BS (e.g., Type 1 CAP or Type 2 CAP) for the UL signal transmission.

(1) Type 1 UL CAP Method

Figure 7:
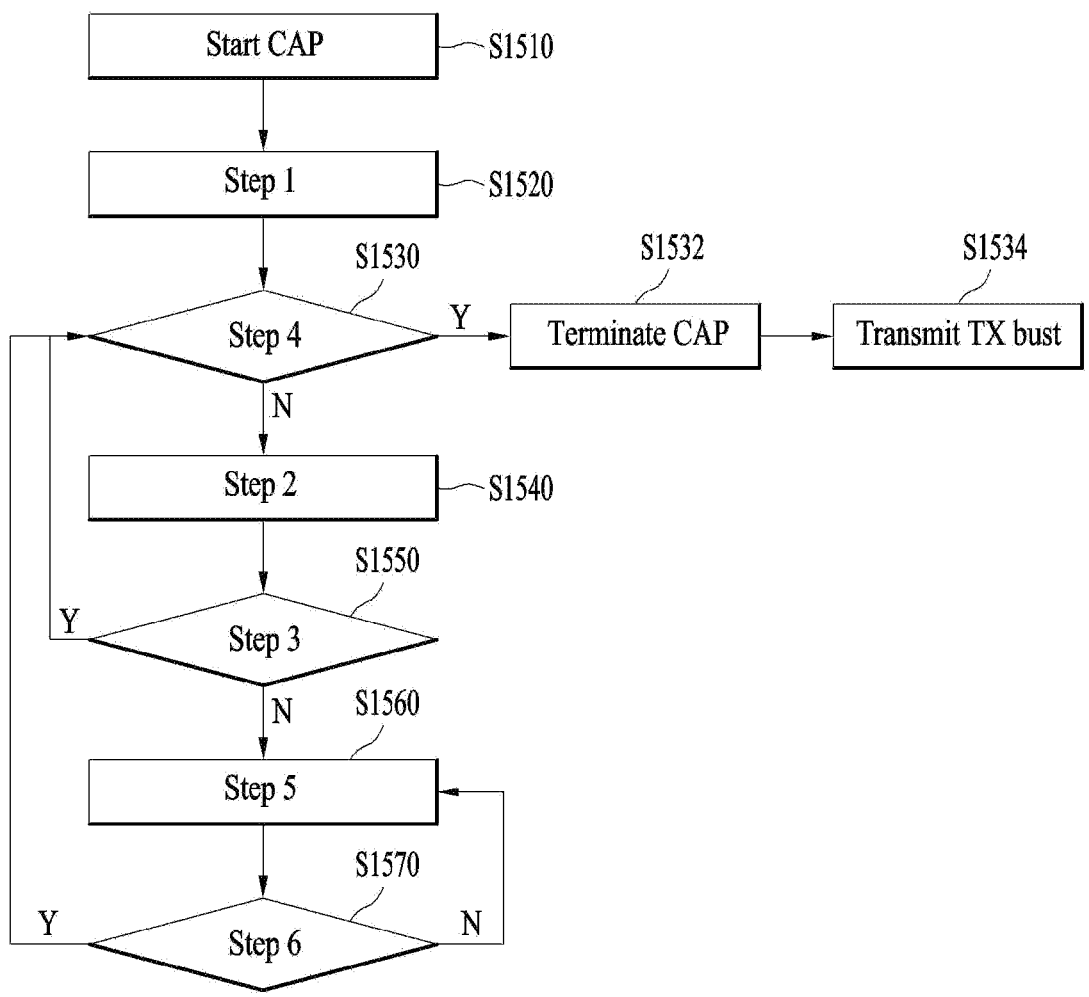

FIG. 7 is a flowchart illustrating UE's Type 1 CAP operation for UL signal transmission.

To transmit a signal in the U-band, the UE may initiate a CAP (S1510). The UE may randomly select a backoff counter N within a contention window (CW) according to step 1. In this case, N is set to an initial value $N_{init}$ (S1520). $N_{init}$ may have a random value between 0 and $CW_p$. If it is determined according to step 4 that the backoff counter value (N) is 0 (YES in S1530), the UE terminates the CAP (S1532). Then, the UE may perform Tx burst transmission (S1534). If the backoff counter value is non-zero (NO in S1530), the UE decreases the backoff counter value by 1 according to step 2 (S1540). The UE checks whether the channel of U-cell(s) is idle (S1550). If the channel is idle (YES in S1550), the UE checks whether the backoff counter value is 0 (S1530). On the contrary, if the channel is not idle in S1550, that is, if the channel is busy (NO in S1550), the UE checks whether the corresponding channel is idle for a defer duration Td (longer than or equal to 25 usec), which is longer than a slot duration (e.g., 9 usec), according to step 5 (S1560). If the channel is idle for the defer duration (YES in S1570), the UE may resume the CAP. Here, the defer duration may include a duration of 16 usec and $m_p$ consecutive slot durations (e.g., 9 usec), which immediately follows the duration of 16 usec. If the channel is busy for the defer duration (NO in S1570), the UE performs step S1560 again to check whether the channel is idle for a new defer duration.

Table 4 shows that the values of $m_p$, a minimum CW, a maximum CW, a maximum channel occupancy time (MCOT), and allowed CW sizes, which are applied to the CAP, vary depending on channel access priority classes.

TABLE 4

| Channel Access Priority Class (p) | $m_p$ | $CW_{min,p}$ | $CW_{max,p}$ | $T_{ulmcotp}$ | allowed $CW_p$ sizes |
|---|---|---|---|---|---|
| 1 | 2 | 3 | 7 | 2 ms | {3, 7} |
| 2 | 2 | 7 | 15 | 4 ms | {7, 15} |
| 3 | 3 | 15 | 1023 | 6 ms or 10 ms | {15, 31, 63, 127, 255, 511, 1023} |
| 4 | 7 | 15 | 1023 | 6 ms or 10 ms | {15, 31, 63, 127, 255, 511, 1023} |

NOTE1:
For p = 3, 4, $T_{ulmcotp}$ = 10 ms if the higher layer parameter 'absenceOfAnyOtherTechnology-r14' indicates TRUE, otherwise, $T_{ulmcotp}$ = 6 ms.
NOTE 2:
When $T_{ulmcotp}$ = 6 ms it may be increased to 8 ms by inserting one or more gaps. The minimum duration of a gap shall be 100 µs. The maximum duration before including any such gap shall be 6 ms.

The size of a CW applied to the Type 1 UL CAP may be determined in various ways. For example, the CW size may be adjusted depending on whether the value of a new data indicator (NDI) for at least one HARQ process associated with HARQ_ID_ref, which is the HARQ process ID of a UL-SCH in a predetermined time period (e.g., a reference TU), is toggled. When the UE performs signal transmission using the Type 1 CAP associated with the channel access priority class p on a carrier, if the value of the NDI for the at least one HARQ process associated with HARQ_ID_ref is toggled, the UE may set $CW_p$ to $CW_{min,p}$ for every priority class p∈{1, 2,3,4}. Otherwise, the UE may increase $CW_p$ for every priority class p∈{1,2,3, 4} to a next higher allowed value.

A reference subframe (or slot) $n_{ref}$ is determined as follows.

When the UE receives a UL grant in a subframe (or slot) $n_g$ and transmits a UL-SCH in subframes (or slots) $n_0$, $n_1$, . . . $n_w$, starting from the subframe (or slot) no without a gap (the subframe (or slot) $n_w$ is the most recent subframe (or slot) before a subframe (or slot) $n_g$–3 in which the UE has transmitted a UL-SCH based on a Type 1 CAP), the reference subframe (or slot) $n_{ref}$ is the subframe (or slot) $n_0$.

(2) Type 2 UL CAP Method

When the UE uses the Type 2 CAP to transmit a UL signal (including the PUSCH) in a U-band, the UE may transmit the UL signal (including the PUSCH) in the U-band immediately after sensing that the channel is idle at least for a sensing period $T_{short\_ul}$ of 25 us. $T_{short\_ul}$ includes a duration $T_f$ of 16 us immediately followed by one slot duration $T_{sl}$ of 9 us. $T_f$ includes an idle slot duration $T_{sl}$ at the start thereof.

2. Random Access Procedure

FIG. 8 illustrates random access procedures. FIG. 8(a) illustrates the contention-based random access procedure, and FIG. 8(b) illustrates the dedicated random access procedure.

Referring to FIG. 8(a), the contention-based random access procedure includes the following four steps. The messages transmitted in steps 1 to 4 may be referred to as message 1 (Msg1) to message 4 (Msg4), respectively.

Step 1: The UE transmits an RACH preamble on a PRACH.

Step 2: The UE receives a random access response (RAR) on a DL-SCH from the BS.

Step 3: The UE transmits a Layer 2 (L2)/Layer 3 (L3) message on a UL-SCH to the BS.

Step 4: The UE receives a contention resolution message on the DL-SCH from the BS.

The UE may receive random access information in system information from the BS.

When the UE needs random access, the UE transmits an RACH preamble to the BS as in step 1. The BS may identify each RACH preamble by a time/frequency resource (RACH occasion (RO)) in which the RACH preamble is transmitted, and a preamble index (PI).

Upon receipt of the RACH preamble from the UE, the BS transmits an RAR message to the UE as in step 2. To receive the RAR message, the UE monitors an L1/L2 PDCCH with a cyclic redundancy check (CRC) masked with a random access-RNTI (RA-RNTI), including scheduling information for the RAR message, within a preconfigured time window (e.g., ra-ResponseWindow). The PDCCH masked with the RA-RNTI may be transmitted only in a common search space. When receiving a scheduling signal masked with the RA-RNTI, the UE may receive an RAR message on a PDSCH indicated by the scheduling information. The UE then checks whether there is RAR information directed to the UE in the RAR message. The presence or absence of the RAR information directed to the UE may be determined by checking whether there is a random access preamble ID (RAPID) for the preamble transmitted by the UE.

The index of the preamble transmitted by the UE may be identical to the RAPID. The RAR information includes the index of the corresponding RACH preamble, timing offset information (e.g., timing advance command (TAC)) for UL synchronization, UL scheduling information (e.g., UL grant) for Msg3 transmission, and UE temporary identification information (e.g., temporary-C-RNTI (TC-RNTI)).

Upon receipt of the RAR information, the UE transmits UL-SCH data (Msg3) on a PUSCH according to the UL scheduling information and the timing offset value, as in step 3. Msg3 may include the ID (or global ID) of the UE. Alternatively, Msg3 may include RRC connection request-related information (e.g., RRCSetupRequest message) for initial access. In addition, Msg3 may include a buffer status report (BSR) on the amount of data available for transmission at the UE.

After receiving the UL-SCH data, the BS transmits a contention resolution message (Msg4) to the UE as in step 4. When the UE receives the contention resolution message and succeeds in contention resolution, the TC-RNTI is changed to a C-RNTI. Msg4 may include the ID of the UE and/or RRC connection-related information (e.g., an RRC-Setup message). When information transmitted in Msg3 does not match information received in Msg4, or when the UE has not received Msg4 for a predetermined time, the UE may retransmit Msg3, determining that the contention resolution has failed.

Referring to FIG. 8(b), the dedicated random access procedure includes the following three steps. Messages transmitted in steps 0 to 2 may be referred to as Msg0 to Msg2, respectively. The BS may trigger the dedicated random access procedure by a PDCCH serving the purpose of commanding RACH preamble transmission (hereinafter, referred to as a PDCCH order).

Step 0: The BS allocates an RACH preamble to the UE by dedicated signaling.

Step 1: The UE transmits the RACH preamble on a PRACH.

Step 2: The UE receives an RAR on a DL-SCH from the BS.

Steps 1 and 2 of the dedicated random access procedure may be the same as steps 1 and 2 of the contention-based random access procedure.

In NR, DCI format 1_0 is used to initiate a non-contention-based random access procedure by a PDCCH order. DCI format 1_0 is used to schedule a PDSCH in one DL cell.

When the CRC of DCI format 1_0 is scrambled with a C-RNTI, and all bits of a "Frequency domain resource assignment" field are 1s, DCI format 1_0 is used as a PDCCH order indicating a random access procedure. In this case, the fields of DCI format 1_0 are configured as follows.

RA preamble index: 6 bits

UL/supplementary UL (SUL) indicator: 1 bit. When the bits of the RA preamble index are all non-zeroes and SUL is configured for the UE in the cell, the UL/SUL indicator indicates a UL carrier in which a PRACH is transmitted in the cell. Otherwise, it is reserved.

SSB (Synchronization Signal/Physical Broadcast Channel) index: 6 bits. When the bits of the RA preamble index are all non-zeroes, the SSB indicator indicates an SSB used to determine an RACH occasion for PRACH transmission. Otherwise, it is reserved.

PRACH mask index: 4 bits. When the bits of the RA preamble index are all non-zeroes, the PRACH mask index indicates an RACH occasion associated with the SSB indicated by the SSB index. Otherwise, it is reserved.

Reserved: 10 bits

When DCI format 1_0 does not correspond to a PDCCH order, DCI format 1_0 includes fields used to schedule a PDSCH (e.g., a time domain resource assignment, a modulation and coding scheme (MCS), an HARQ process number, a PDSCH-to-HARQ_feedback timing indicator, and so on).

2-Step Random Access Procedure

In the prior art, random access is performed by a 4-step procedure as described above. In the legacy LTE system, an average of 15.5 ms is required for the 4-step random access procedure.

TABLE 5

| Component | Description | Time (ms) |
|---|---|---|
| 1 | Average delay due to RACH scheduling period (1 ms RACH cycle) | 0.5 |
| 2 | RACH Preamble | 1 |
| 3-4 | Preamble detection and transmission of RA response (Time between the end RACH transmission and UE's reception of scheduling grant and timing adjustment) | 3 |
| 5 | UE Processing Delay (decoding of scheduling grant, timing alignment and C-RNTI assignment + L1 encoding of RRC Connection Request) | 5 |
| 6 | Transmission of RRC and NAS Request | 1 |
| 7 | Processing delay in eNB (L2 and RRC) | 4 |
| 8 | Transmission of RRC Connection Set-up (and UL grant) | 1 |

The NR system may require lower latency than conventional systems. When random access occurs in a U-band, the random access may be terminated, that is, contention may be resolved only if the UE and BS sequentially succeed in LBT in all steps of the 4-step random access procedure. If the LBT fails even in one step of the 4-step random access procedure, resource efficiency may decrease, and latency may increase. If the LBT fails in a scheduling/transmission process associated with Msg2 or Msg3, the resource efficiency may significantly decrease, and the latency may significantly increase. For random access in an L-band, low latency may be required in various scenarios of the NR system. Therefore, a 2-step random access procedure may be performed in the L-band as well.

In order to reduce the latency in the random access procedure, a 2-step random access procedure is proposed in the present disclosure.

As illustrated in FIG. 9(a), the 2-step random access procedure may include two steps: transmission of a UL signal (referred to as MsgA) from the UE to the BS and transmission of a DL signal (referred to as MsgB) from the BS to the UE.

The following description focuses on the initial access procedure, but the proposed methods may be equally applied to the random access procedure after the UE and BS establish an RRC connection. Further, a random access preamble and a PUSCH part may be transmitted together in a non-contention random access procedure as shown in FIG. 9(b).

While not shown, the BS may transmit a PDCCH for scheduling MsgB to the UE, which may be referred to as an MsgB PDCCH.

RB Interlace

Figure 10:
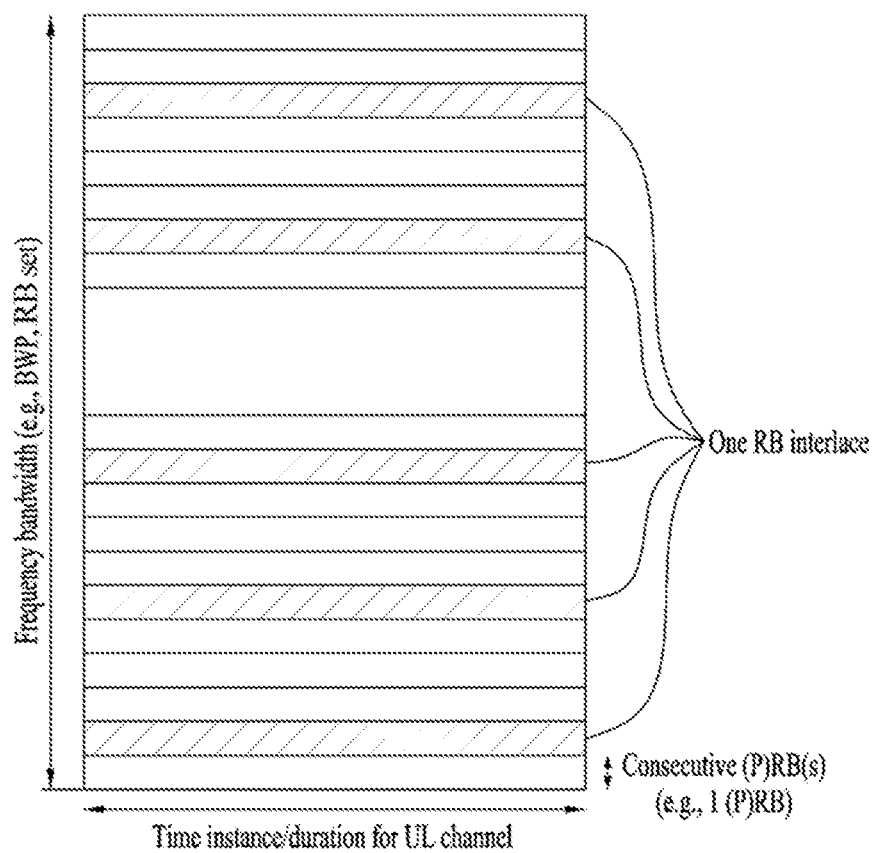
FIG. 10 illustrates a resource block (RB) interlace.

FIG. 10 illustrates an RB interlace. In a shared spectrum, a set of inconsecutive RBs (at the regular interval) (or a single RB) in the frequency domain may be defined as a resource unit used/allocated to transmit a UL (physical) channel/signal in consideration of regulations on occupied channel bandwidth (OCB) and power spectral density (PSD). Such a set of inconsecutive RBs is defined as the RB interlace (or interlace) for convenience.

Referring to FIG. 10, a plurality of RB interlaces (interlaces) may be defined in a frequency bandwidth. Here, the frequency bandwidth may include a (wideband) cell/CC/BWP/RB set, and the RB may include a PRB. For example, interlace #m$\in\{0, 1, \ldots M-1\}$ may consist of (common) RBs $\{m, M+m, 2M+m, 3M+m, \ldots\}$, where M represents the number of interlaces. A transmitter (e.g., UE) may use one or more interlaces to transmit a signal/channel. The signal/channel may include a PUCCH or PUSCH.

The signal/channel may include PUCCH, PUSCH and/or PRACH.

3. PRACH Transmission in High Frequency Band

The above-described contents (NR frame structure, U-Band system, etc.) may be applied in combination with the methods according to the present disclosure described later, or may be supplemented to clarify the technical features of the methods proposed in the present disclosure.

In addition, the methods to be described later are related to uplink transmission and may be equally applied to the uplink signal transmission method in the above-described NR system (licensed band) or U-band system (unlicensed band). It should also be noted that embodiments of the present disclosure can be modified or replaced to fit the terms, expressions, structures, etc. defined in each system such that the technical idea proposed in the present disclosure can be implemented in the corresponding system.

For example, downlink transmission using the methods described below may be performed in the L-cell and/or U-cell defined in the U-band system.

In a cellular communication system such as the LTE/NR system, utilizing not only the unlicensed bands such as the 2.4 GHz band, which is mainly used by the legacy Wi-Fi system, but also the unlicensed bands such as the 5/6 GHz and 60 GHz bands for traffic offloading is under discussion.

As described above, in the Wi-Fi standard (802.1 lac), the CCA threshold is defined as −62 dBm for the non-Wi-Fi signal and −82 dBm for the Wi-Fi signal. In other words, when a station (STA) or an access point (AP) of the Wi-Fi system receives a signal from a device not belonging to the Wi-Fi system at the power of −62 dBm or more in a specific band, it skips signal transmission in the specific band.

In the present disclosure, the term "unlicensed band" may be replaced or interchangeably used with "shared spectrum."

The NR system supports a number of kinds of numerology and SCS to support various services. For example, when the SCS is 15 kHz, the NR system supports a wide area in traditional cellular bands. When the SCS is 30 kHz/60 kHz, the NR system supports a dense-urban, lower latency and wider carrier bandwidth. When the SCS is 60 kHz or higher, the NR system supports a bandwidth greater than 24.25 GHz to overcome phase noise.

The NR frequency band is defined as two types of frequency ranges, FR1 and FR2. FR1 and FR2 may be configured as shown in Table 6. FR2 may represent a millimeter wave (mmW).

TABLE 6

| Frequency Range designation | Corresponding frequency range | Subcarrier Spacing |
| --- | --- | --- |
| FR1 | 410 MHz-7125 MHz | 15, 30, 60 kHz |
| FR2 | 24250 MHz-52600 MHz | 60, 120, 240 kHz |

A band (e.g., the 52.6 GHz to 114.25 GHz bands, particularly 71 GHz) higher than the FR1 and FR2 bands is referred to as FR4.

The FR4 band may be used as an unlicensed band.

The configuration for a PRACH transmission occasion for the conventional FR2 region is shown in FIG. 11. FIG. 11 is an excerpt from Section 5.3.2 of the document 3GPP TS 38.211, and Tables 6.3.3.2-2 to 6.3.3.2-4 refer to the tables in the document 3GPP TS 38.211. Referring to FIG. 11, the configuration of the PRACH transmission occasion is defined based on the slot for the 60 kHz SCS. When the 120 kHz SCS is used, two slots corresponding to the 120 kHz SCS may be present in one slot corresponding to the 60 kHz SCS. Accordingly, when the 120 kHz SCS is used, a method of selecting one or two of the two slots corresponding to the one slot of the 60 kHz SCS as a PRACH transmission occasion is described. In the present disclosure, the slots of Y kHz SCS corresponding to the slots of X kHz SCS (where X and Y are any positive numbers, and X is less than Y) may mean slots of Y kHz that may be included in the time interval occupied by the slot of X kHz SCS. In general, slots of Y kHz SCS are included in the slot of X kHz SCS by the ratio of X to Y. For example, the slots of 480 kHz corresponding to the 60 kHz SCS may be 8 slots (since 60:480=1:8).

In FIG. 11, when the value of the parameter "Number of PRACH slots within a 60 kHz slot" is 1, only one of the two slots of the 120 kHz SCS corresponding to one slot of the two 60 kHz SCS is used as a slot for PRACH transmission. Referring to FIG. 11, the later one of the two slots of the 120 kHz SCS is used as a slot for PRACH transmission (i.e., $n_{slot}^{RA}=1$)

When the value of the parameter "Number of PRACH slots within a 60 kHz slot" is 2 (this case is described as "otherwise" in FIG. 11. However, the "Number of PRACH slots within a 60 kHz slot" has only a value of 1 or 2, and therefore, "otherwise" refers to 2), both slots of the 120 kHz SCS corresponding to one slot of 60 kHz SCS are used as slots for PRACH transmission (i.e., $n_{slot}^{RA} \in \{0,1\}$).

In the FR4 region, it is considered to use a greater SCS value (e.g., 240 kHz, 480 kHz, 960 kHz) than the 120 kHz SCS. Currently, a method for configuring a PRACH transmission occasion for an SCS value greater than the 120 kHz SCS and a PRACH configuration table have not been invented. Therefore, there is a need for a method for configuring a PRACH transmission occasion for a high frequency band.

The following proposed methods may be considered as a PRACH transmission occasion configuration method for FR4. In the methods proposed below, a reference SCS represents an SCS that is a reference for defining a PRACH configuration table. The reference SCS serves as a reference for the size of a single slot required to configure a PRACH transmission occasion using an SCS larger than the reference SCS. For example, for FR2, the 60 kHz SCS is a reference SCS, and up to 120 kHz SCS is supported.

In addition, the methods proposed below are mainly described based on the PRACH transmission occasion of a 4-step RACH, but may be equally or similarly applied to the PRACH transmission occasion and/or the PUSCH transmission occasion for a 2-step RACH. Hereinafter, the PRACH transmission occasion may be referred to as RO, and the PUSCH transmission occasion may be referred to as PO. Also, the PRACH slot of FIG. 11 may be referred to as a RACH slot.

[Proposed method 1: Defining 60 kHz as a reference SCS and defining a RACH slot calculation method for new SCS values in addition to the equation for RACH slot calculation in FIG. 11]

In the first method, the PRACH configuration tables (Tables 6.3.3.2-2 to 6.3.3.2-4 of the document 3GPP TS 38.211) used for the previously defined FR2 are used even in the FR4 region, and the 60 kHz SCS is defined as a reference SCS as in the existing FR2. In FR4, SCS such as 120 kHz, 240 kHz, 480 kHz, and 960 kHz may be additionally introduced.

For a single slot of the 60 kHz SCS, a different number of N slots may correspond to each SCS considered in FR4. Values that may be $n_{slot}^{RA}$ in Equation 1 are $\{0, 1, \ldots, N-1\}$. N may be a value obtained by dividing each SCS value considered in FR4 by the 60 kHz SCS. For example, in the case of 240 kHz SCS, the possible values of $n_{slot}^{RA}$ are $\{0, 1, 2, 3\}$. In the case of 960 kHz SCS, the possible values of $n_{slot}^{RA}$ are $\{0, 1, \ldots, 15\}$. Hereinafter, $n_{slot}^{RA}$ may be referred to as a "value for a PRACH slot."

$$l=l_0+n_t^{RA}N_{dur}^{RA}+14n_{slot}^{RA} \qquad \text{[Equation 1]}$$

According to proposed method 1, two values among the possible values of $n_{slot}^{RA}$ for each SCS may be selected according to a specific rule, and the PRACH configuration table for FR2 may be reused. The two selected values may be reinterpreted as a first slot defined for 120 kHz in the PRACH configuration table (the part to which $n_{slot}^{RA}=0$ is substituted in FIG. 11) or a second slot (the part to which $n_{slot}^{RA}=1$ is substituted in FIG. 11).

For example, the smaller one of the two selected values may be reinterpreted as the first slot (the part corresponding to $n_{slot}^{RA}=0$ in FIG. 11), and the greater value may be reinterpreted as the second slot (the part corresponding to $n_{slot}^{RA}=1$ in FIG. 11). As a specific example, when the two selected values are a and b (a<b), the part to which $n_{slot}^{RA}=0$ is substituted in FIG. 11 may be reinterpreted as $n_{slot}^{RA}=a$ (for the first slot), and the part to which $n_{slot}^{RA}=1$ is substituted in FIG. 11 may be reinterpreted as $n_{slot}^{RA}=b$ (for the second slot).

Figure 12:
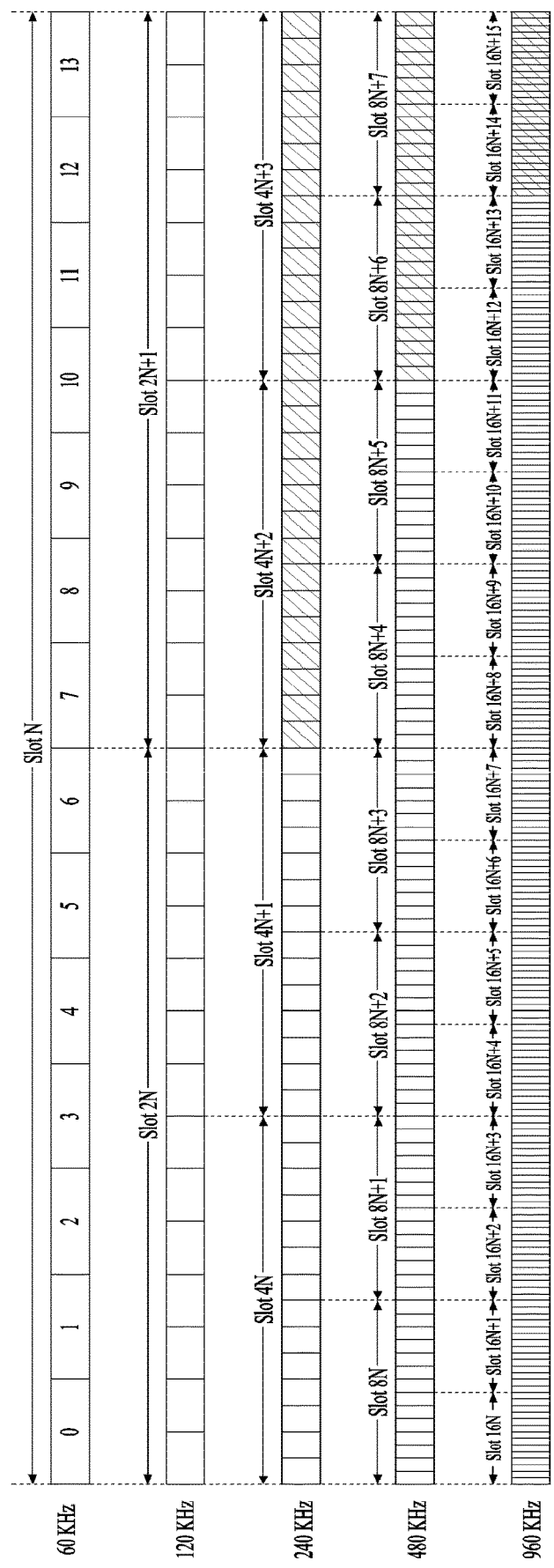
Figure 13:
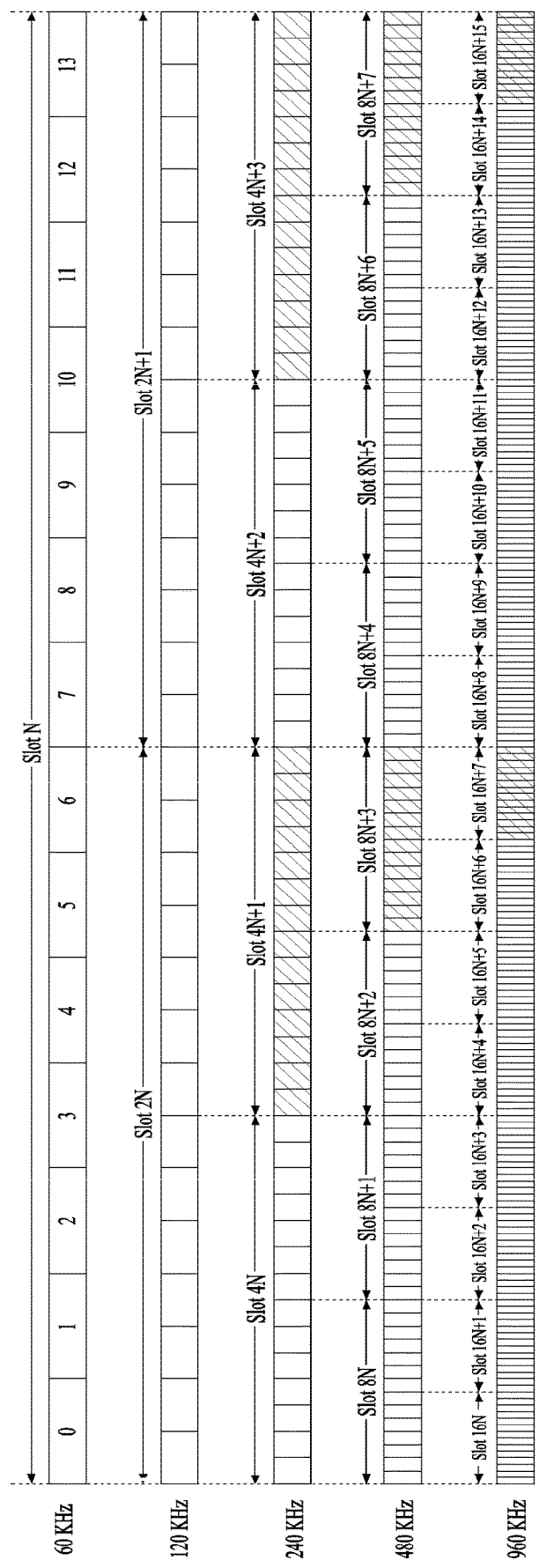

As one of the specific rules for selecting two values among the possible values of $n_{slot}^{RA}$ for each SCS, the two greatest values (i.e., N-1, N-2) may be selected from among 0 to N-1 that may be values of $n_{slot}^{RA}$. Alternatively, the greatest number and the median (i.e., N-1, N/2-1) may be selected. An example of the PRACH transmission occasion given when the two greatest values (i.e., N-1, N-2) are selected is shown in FIG. 10. In addition, an example of the PRACH transmission occasion given when the greatest number and the median (i.e., N−1, N/2−1) are selected is shown in FIG. 11. For the 60 kHz SCS and 120 kHz SCS, the PRACH transmission occasion is determined by the conventional technology. When proposed method 1 is applied to 240 kHz, 480 kHz, and 960 kHz SCSs, slots indicated by hatched lines in FIGS. 12 and/or 13 are slots including a PRACH transmission occasion.

In the examples of proposed method 1, selecting the slots corresponding to the two greatest numbers (N−2, N−1) as a PRACH transmission occasion results in setting, based on the single slot of the 60 kHz SCS, the PRACH transmission occasion to the last slot (based on the SCS greater than 60 kHz). This result has an advantage in determining validation of the PRACH transmission occasion because a UL symbol is very likely to be present at the rear in the TDD configuration.

Selecting the greatest number and the median (N/2−1, N−1) as another example, has an advantage in that the PRACH transmission occasion time interval is widened and thsu time diversity may be obtained.

[Proposed method 1-A: Defining 60 kHz as a reference SCS and configuring one (or two) RACH slots for new SCS values in addition to the equation for RACH slot calculation in FIG. 11]

In addition to the proposed method 1, the BS may indicate to the UE one or two slot indexes among the values that may be $n_{slot}^{RA}$ in the above equation through higher layer signaling (e.g., SIB or dedicated RRC signaling).

As an example, when the BS sets the "Number of PRACH slots within a 60 kHz slot" to 1, the UE may configure a PRACH transmission occasion in slot N−1 (i.e., the last slot among the N slots corresponding to the 60 kHz SCS single slot duration). The UE may configure a PRACH transmission occasion in a specific slot, slot k, indicated by the BS. Thereafter, the UE may transmit the PRACH preamble through the designated PRACH transmission occasion.

As another example, when the BS sets the "Number of PRACH slots within a 60 kHz slot" to 2, two slot indexes indicated by the BS may be used. The UE may reinterpret the smaller one of the two values indicated by the BS as the first slot (the part corresponding to $n_{slot}^{RA}=0$ in FIG. 11) or the second slot (the part corresponding to $n_{slot}^{RA}=1$ in FIG. 11). For example, the smaller one of the two selected values may be reinterpreted as the first slot (the part corresponding to $n_{slot}^{RA}=0$ in FIG. 11), and the greater value may be reinterpreted as the second slot (the part corresponding to $n_{slot}^{RA}=1$ in FIG. 11). As a specific example, when the two selected values are a and b (a<b), the part to which $n_{slot}^{RA}=0$ is substituted in FIG. 11 may be reinterpreted as $n_{slot}^{RA}=a$ (for the first slot), and the part to which $n_{slot}^{RA}=1$ is substituted in FIG. 11 may be reinterpreted as $n_{slot}^{RA}=b$ (for the second slot).

Alternatively, the BS may distinguish slot values serving as the first slot and the second slot and separately indicate the same to the UE. Alternatively, the BS may indicate only the slot index corresponding to the first slot as slot k, and configure the slot index corresponding to the second slot as slot N−1 (i.e., the last slot among the N slots corresponding to the 60 kHz SCS single slot duration). Thereafter, the UE may configure a PRACH transmission occasion in the indicated/configured slot and transmit the PRACH preamble therethrough.

With the proposed method, it is not necessary to modify the equation for configuring the PRACH configuration table and the PRACH transmission occasion for the existing FR2.

[Proposed method 1-B: Configuring 60 kHz as reference slot SCS and configuring a 480/960 kHz RACH slot based on a 120 kHz RACH slot on the condition that the configuration of the 120 kHz RACH slot is received]

The BS may configure a 120 kHz RACH slot according to the method disclosed in FIG. 11. Next, when the SCS to be actually used in the RACH procedure is set to 480 kHz and/or 960 kHz, the RACH slot may be configured/indicated using the following methods.

[Method 1-B-1] A specific one (e.g., the first slot in time, or the last slot in time) of a plurality of 480 kHz slots and/or 960 kHz slots corresponding to a 120 kHz RACH slot or a specific number of slots (e.g., slots configured by the BS) may be configured as an actual 480 kHz RACH slot and/or a 960 kHz RACH slot.

When the BS indicates one or multiple slots, the BS may indicate a slot number based on a specific SCS (e.g., 480 kHz SCS). The UE may use a value indicated for another SCS by scaling the same at the SCS ratio. As an example, the BS may configure slot indexes a and b based on the 480 kHz SCS. In this case, when the actual SCS for the RACH is 960 kHz, the UE may configure x2 (or x2+1), where x denotes each slot index, and use slot indexes 2a (or 2a+1) and 2b (or 2b+1) as RACH slots. Here, +1 is added to select a later slot between the slots facing each other.

For example, when the BS indicates PRACH config index 17 as shown in FIG. 14, 120 kHz slots (e.g., slots 18, 19, 38, 39, 58, 59, 78, 79) corresponding to 60 kHz reference slots 9, 19, 29, and 39 are RACH slot candidates. Since the "Number of PRACH slots within a 60 kHz slot" is set to 2, the 120 kHz slots (e.g., slots 18, 19, 38, 39, 58, 59, 78, 79) corresponding to the 60 kHz reference slots 9, 19, 29, and 39 are all configured as RACH slots.

The number of 480 kHz slots or 960 kHz slots corresponding to the 120 kHz slots configured as RACH slots may have four or eight per 120 kHz slot. As in the examples of FIG. 14, one or more slots may be used as RACH slots.

Figure 15:
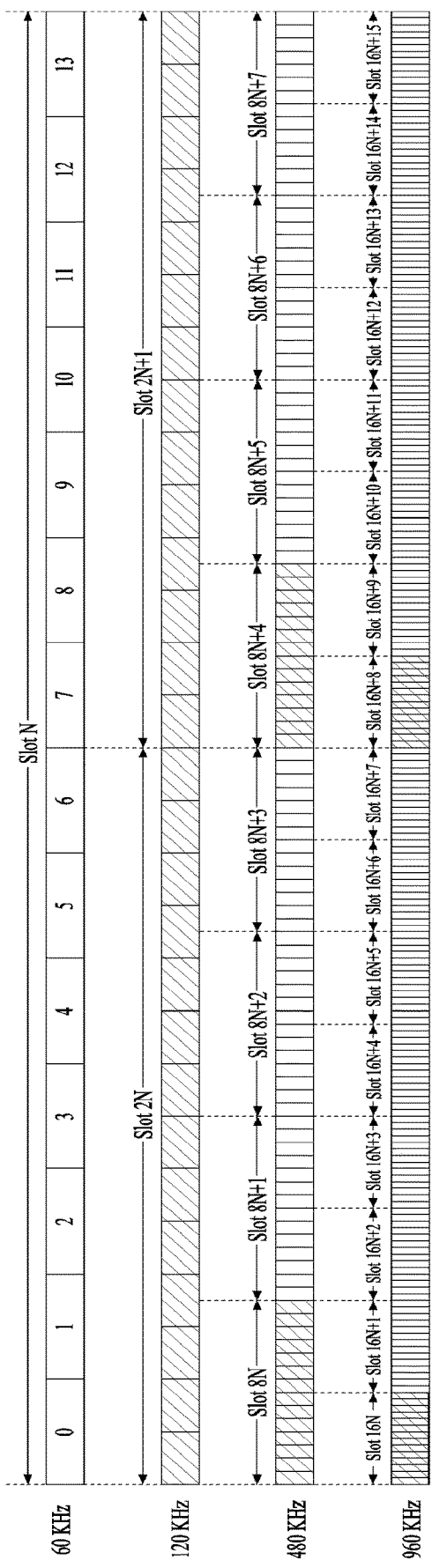
Figure 16:
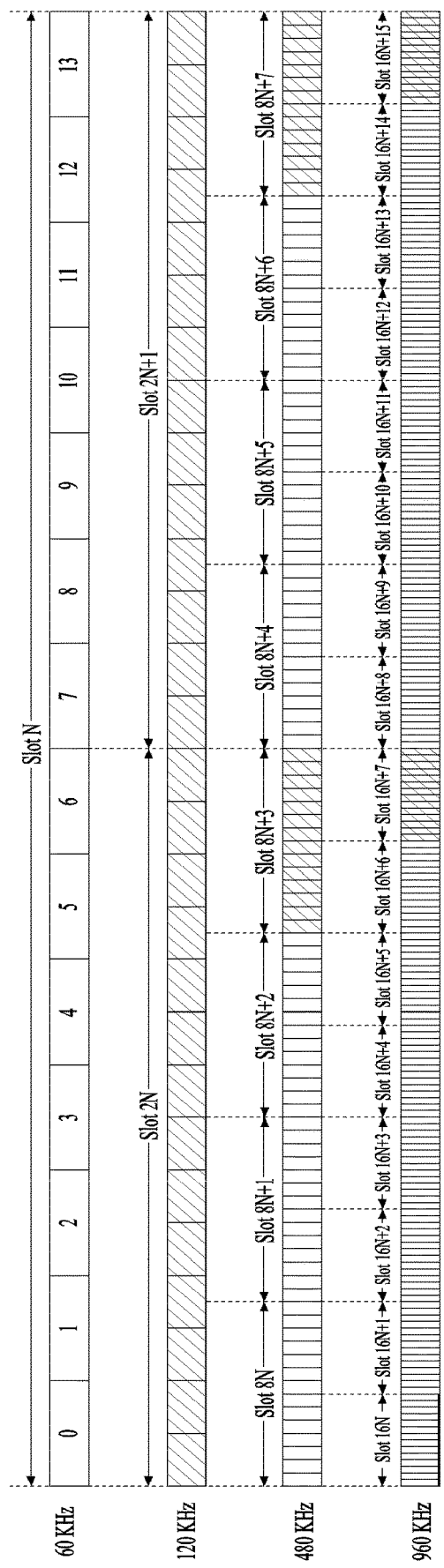

FIG. 15 shows an example in which the first slot among the 480 kHz slots and/or 960 kHz slots corresponding to a configured 120 kHz RACH slot is used as a RACH slot. FIG. 16 shows an example in which the last slot among the 480 kHz slots and/or 960 kHz slots corresponding to the configured 120 kHz RACH slot is used as a RACH slot.

Figure 17:
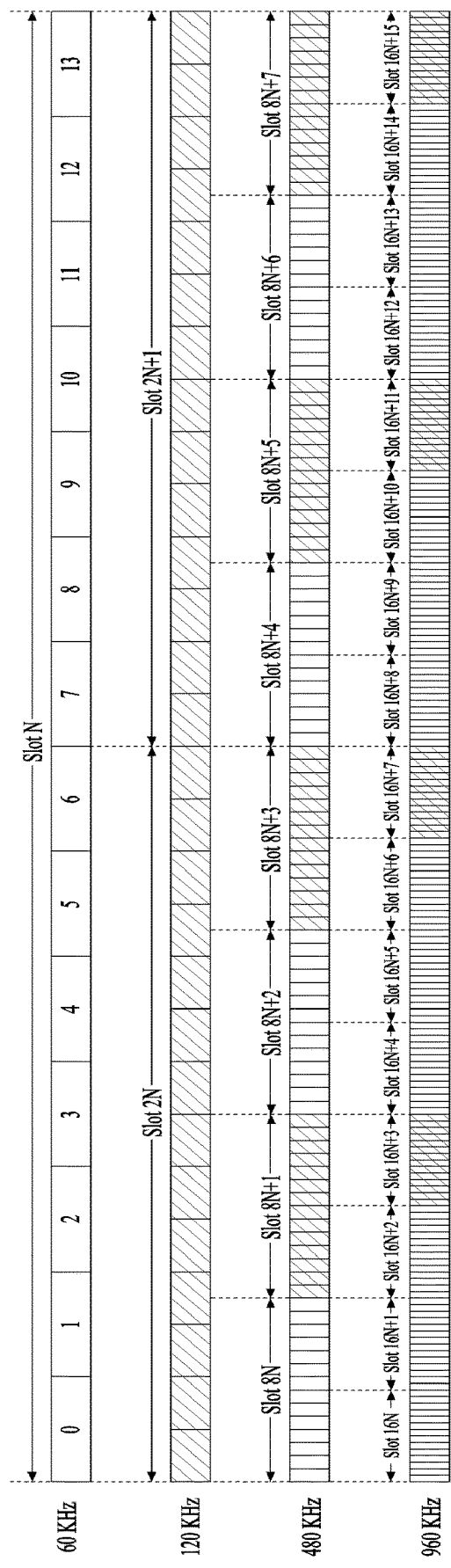

FIG. 17 shows an example in which a slot of a configured slot index among the 480 kHz slots and/or 960 kHz slots corresponding to the configured 120 kHz RACH slot is used as a RACH slot. FIG. 17 shows an example in which slot indexes 8N+1, 8N+3, 8N+5 and 8N+7 are configured as RACH slots based on the 480 kHz SCS and an example in which slot indexes 16N+3, 16N+7, 16N+11 and 16N+15 are configured as RACH slots based on the 960 kHz SCS. Slots of other indexes configured differently from FIG. 17 may be used as RACH slots.

[Method 1-B-2] All the multiple 480 kHz slots and/or 960 kHz slots corresponding to the configured 120 kHz RACH slot may be configured as 480 kHz RACH slots and/or 960 kHz RACH slots.

In this case, referring to the example (e.g., PRACH config index 17) through FIG. 14 of Method 1-B-1, 120 kHz slots (e.g., slots 18, 19, 38, 39, 58, 59, 78, and 79) are all configured as RACH slots.

Figure 18:
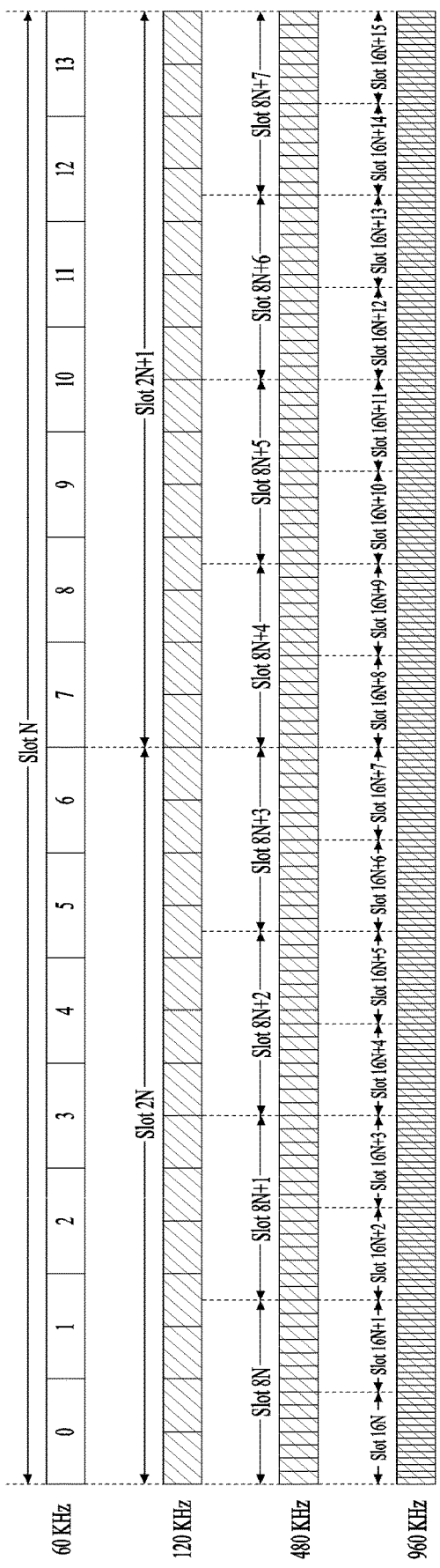

The number of 480 kHz slots or 960 kHz slots corresponding to the 120 kHz slots configured as RACH slots may have four or eight per 120 kHz slot. As in the example of FIG. 18, all the 480 kHz slots or 960 kHz slots corresponding to the 120 kHz slot may be used as RACH slots.

[Method 1-B-3] 80 slots (i.e., radio frame) to be included in one radio frame including the configured 120 kHz RACH slot and the normal slot (a slot that is not a RACH slot) may be configured. RACH slots may be configured by repeating the configured radio frame for 120 kHz 4 times within a period of 320 slots in the radio frame for 480 kHz. RACH slots may be configured by repeating the configured radio frame for 120 kHz 8 times within a period of 640 slots in the radio frame for 960 kHz.

Method 1-B-3 is different from methods 1-B-1 and 1-B-2 in that slots corresponding to the 120 kHz RACH slot are not selected, but the slot configuration is established by repeating the 80 slots for 120 kHz 4 times at 480 kHz and/or repeating the same 8 times at 960 kHz.

For example, when slot indexes {a, b, . . . , x} among the 80 slots constituting the radio frame based on the 120 kHz SCS are configured as RACH slots, slot indexes {a, b, . . . , x, . . . , 80+a, 80+b, . . . , 80+x, . . . , 160+a, 160+b, . . . , 160+x, . . . , 240+a, 240+b, . . . , 240+x} among the 320 slots constituting the radio frame based on the 480 kHz SCS are configured as RACH slots (i.e., the RACH slot pattern of the 480 kHz SCS or the 120 kHz SCS is repeated 4 times).

As another example, when slot indexes {a, b, . . . , x} among the 80 slots constituting the radio frame based on the 120 kHz SCS are configured as RACH slots, slot indexes {a, b, . . . , x, . . . 80+a, 80+b, . . . , 80+x, . . . , 160+a, 160+b, . . . , 160+x, . . . , 240+a, 240+b, . . . , 240+x, . . . , 320+a, 320+b, . . . , 320+x, . . . , 400+a, 400+b, . . . , 400+x, . . . , 480+a, 480+b, . . . , 480+x, . . . , 560+a, 560+b, . . . 560+x} among the 640 slots constituting the radio frame based on the 960 kHz SCS are configured as RACH slots (i.e., the RACH slot pattern of the 960 kHz SCS or the 120 kHz SCS is repeated 8 times).

According to Method 1-B-3, RACH slot configuration may be established for the 480 or 960 kHz SCS based on legacy configuration methods by adding the operation of repeating the RACH slot pattern, without the need for the BS to signal additional information for a UE operation.

[Proposed method 1-C: Configuring 60 kHz as reference SCS and configuring the position of an RO of a 480/960 kHz RACH slot based on the position of the RO mapped to the 120 kHz RACH slot on the condition that configuration of the 120 kHz RACH slot is received (or 120 kHz is set as the reference SCS)]

The BS may set 60 kHz as a reference SCS and configure a 120 kHz RACH slot, or may set 120 kHz as a reference SCS and configure a 120 kHz RACH slot. According to the RACH configuration established/indicated by the BS, ROs for the UE may be mapped to the corresponding RACH slot. 4*X (or 8*X) OFDM symbols using the 480/960 kHz SCS corresponding to X-OFDM symbols occupied by ROs for the 120 kHz SCS may be candidates for the RO positions.

Figure 19:
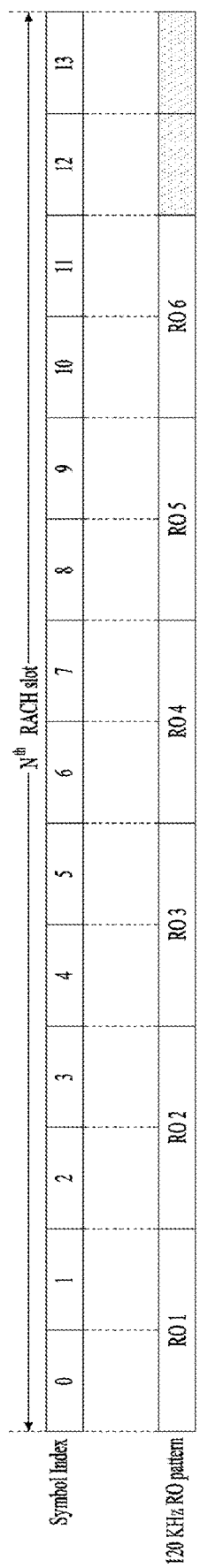

For example, when the BS indicates PRACH config index 17 as shown in FIG. 14, RACH slots may be configured in the 60 kHz reference slot indexes 9, 19, 29, and 39. In terms of 120 kHz, RACH slots may be configured in slot indexes 18, 19, 38, 39, 58, 59, 78, and 79 (because the Number of PRACH slots within a 60 kHz slot is 2). An example of representation of mapping of an RO to 120 kHz reference slot index N is shown in FIG. 19.

In this case, OFDM symbols for the 480/960 kHz SCS corresponding to the OFDM symbols occupied by the ROs for the 120 kHz SCS may be candidates for the RO positions.

Figure 20:
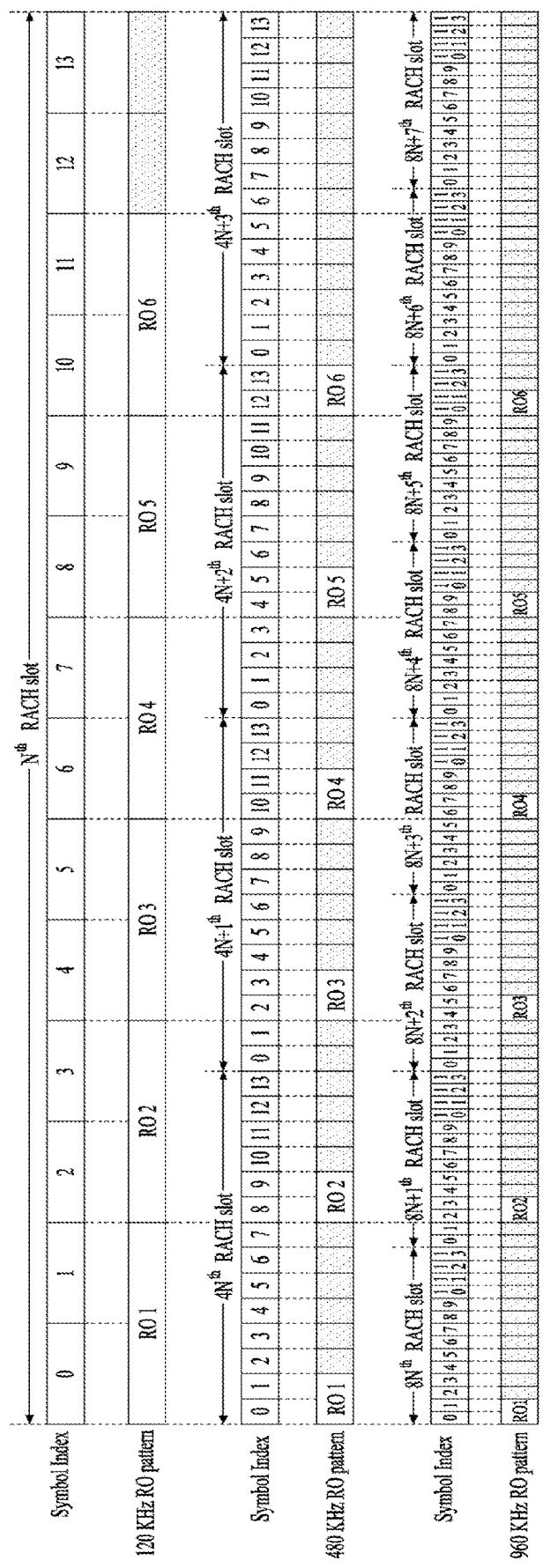

As an example, the start OFDM symbol of the RO may be aligned may be used. An example of representation of the RO mapping of 480/960 kHz with reference to FIG. 19 is shown in FIG. 20. Referring to FIG. 20, among the 480/960 kHz SCS-applied OFDM symbols corresponding to the OFDM symbols occupied by ROs to which the 120 kHz SCS is applied, OFDM symbols corresponding to a PRACH duration from the first OFDM symbol may be mapped to ROs.

As a second example, among the 480/960 kHz SCS-applied OFDM symbols corresponding to OFDM symbols occupied by ROs to which the 120 kHz SCS is applied, the last OFDM symbol boundary of the RO (i.e., the point where OFDM symbol ends) may be aligned.

Figure 21:
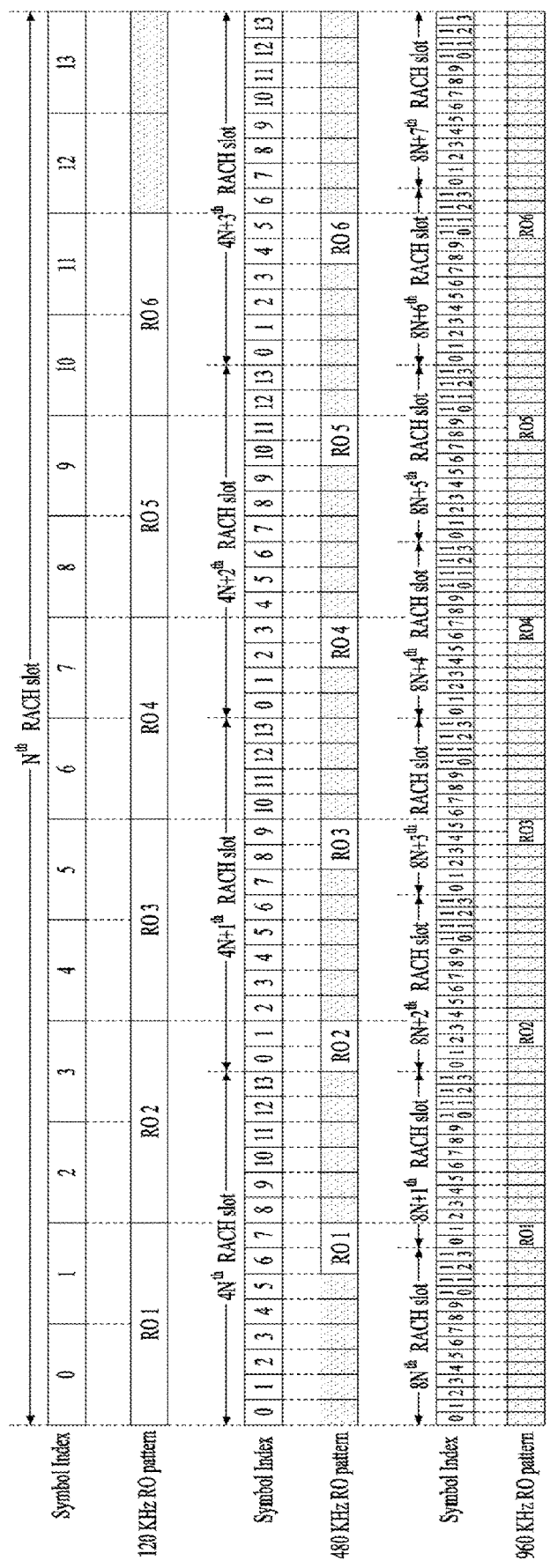
Figure 23:
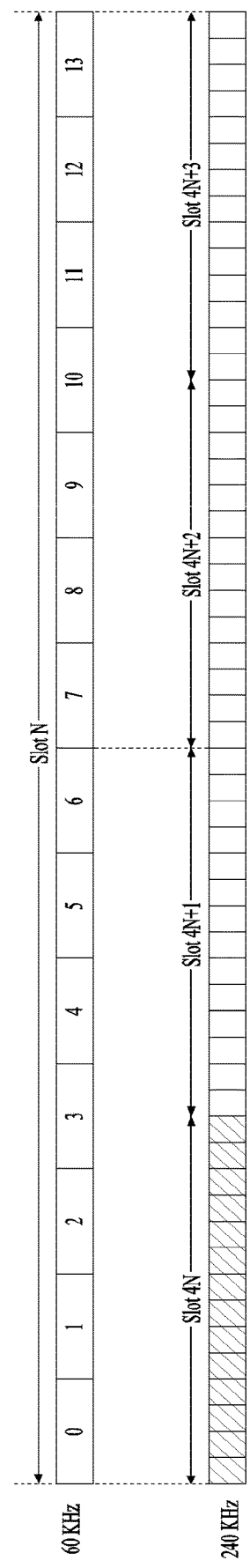
Figure 24:
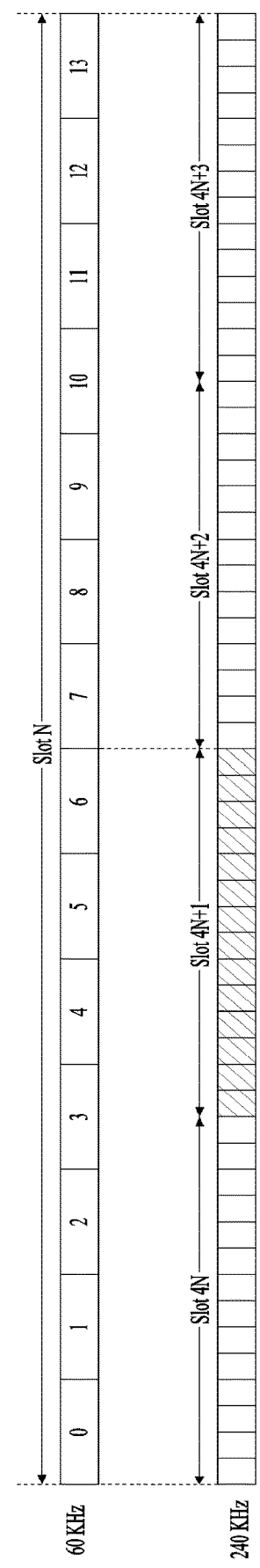
Figure 25:
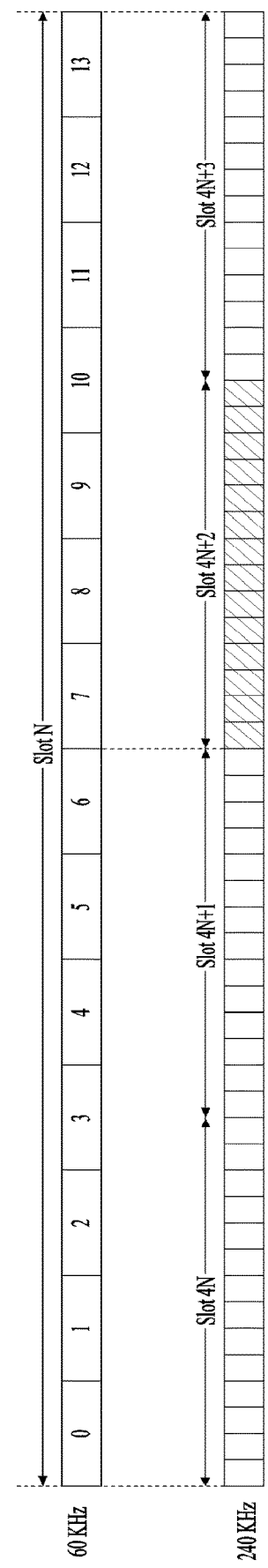
Figure 26:
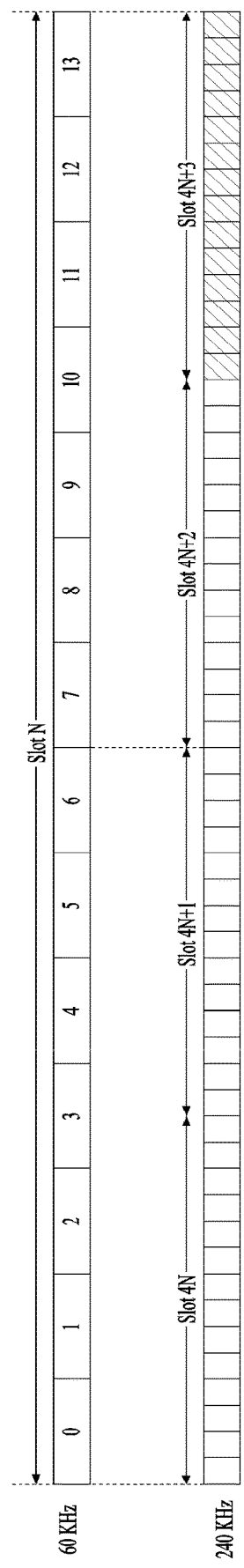

An example of representation of the RO mapping of 480/960 kHz with reference to FIG. 19 is shown in FIG. 21. Referring to FIG. 21, among the 480/960 kHz SCS-applied OFDM symbols corresponding to the OFDM symbols occupied by ROs to which the 120 kHz SCS is applied, the RO mapping may start with an OFDM symbol preceding the last OFDM symbol by a PRACH duration such that the OFDM symbols up to the last OFDM symbol may be mapped to ROs.

As in Method 1-C, when ROs to which different SCSs are applied are aligned with an OFDM symbol boundary at a specific predefined position, the changed operation may be simple compared to the existing RO mapping method, and thus UE complexity may be reduced. That is, a method of "aligning the starting symbol boundary of the RO of 480/960 kHz SCS with the starting symbol boundary of the RO of the 120 kHz SCS" or "aligning the ending symbol boundary of the RO of the 480/960 kHz SCS with the ending symbol boundary of the RO of the 120 kHz SCS" may be considered.

The BS may configure and/or indicate a specific OFDM symbol among 4*X (or 8*X) the 480 (or 960) kHz SCS-applied OFDM symbols corresponding to the X OFDM symbols occupied by ROs to which the 120 kHz SCS is applied as a starting point of RO mapping. Alternatively, the BS configure and/or indicate starting of RO mapping from one of 4 (or 8) OFDM symbols (with a spacing of X OFDM symbols considering that each RO occupies X OFDM symbols) among 4*X (or 8*X) 480 (or 960) kHz SCS-applied OFDM symbols corresponding to the X OFDM symbols occupied by an RO to which 120 kHz SCS is applied.

When the UE maps an RO, starting at a specific OFDM symbol position indicated by the BS, the mapped RO may be expected not to be outside the 480 (or 960) kHz-applied OFDM symbols corresponding to the OFDM symbols occupied by the RO for the 120 kHz SCS.

For example, the BS may indicate one in {0, 1, . . . , 4*X-X} for 480 kHz SCS, and one in {0, 1, . . . , 8*X-X} for 960 kHz. The UE may expect that one in {0, 1, . . . , 4*X-X} is indicated for 480 kHz SCS, and that one in {0, 1, . . . , 8*X-X} is indicated for 960 kHz.

Alternatively, the BS may indicate one in {0, X, 2*X, . . . , 4*X-X} for 480 kHz SCS, and one in {0, X, 2*X, . . . , 8*X-X} for 960 kHz. The UE may expect that one in {0, X, 2*X, . . . , 4*X-X} is indicated for 480 kHz SCS, and that one in {0, X, 2*X, . . . , 8*X-X} is indicated for 960 kHz.

More specifically, when the PRACH duration of 120 kHz SCS is 2 OFDM symbols, 8 OFDM symbols corresponding to the 2 OFDM symbols may be candidates for the RO in the case of 480 kHz SCS, and 16 OFDM symbols corresponding to the 2 OFDM symbols may be candidates for the RO in the case of 960 kHz SCS. Since the PRACH duration is 2 OFDM symbols, the BS may indicate one in {0, 1, . . . , 6} for 480 kHz SCS, and one in {0, 1, . . . , 14} for 960 kHz. The UE may expect that one in {0, 1, . . . , 6} is indicated for 480 kHz SCS, and that one in {0, 1, . . . , 14} is indicated for 960 kHz.

Alternatively, the BS may indicate one in {0, 2, 4, 6} for 480 kHz SCS and one in {0, 2, 4, ..., 14} for 960 kHz (with a spacing of 2 OFDM symbols considering that each RO may occupy 2 OFDM symbols). The UE may expect that one in {0, 2, 4, 6} is indicated for 480 kHz SCS, and that one in {0, 2, 4, ..., 14} is indicated for 960 kHz.

Specifically, the symbol level index mentioned in Method 1-C is not an OFDM symbol index within an actual slot of 480/960 kHz SCS, and corresponds to indexing from 0 to 4*X−1 in chronological order for 4*X 480 kHz SCS-applied OFDM symbols corresponding to X OFDM symbols occupied by ROs to which 120 kHz SCS is applied. Alternatively, it corresponds to indexing from 0 to 8*X−1 in chronological order for 8*X 960 kHz SCS-applied OFDM symbols corresponding to the X OFDM symbols occupied by the ROs to which 120 kHz SCS is applied.

Equation 2 below is a conventional equation for deriving the RA-RNTI.

$$\text{RA-RNTI} = 1 + s\_id + 14 \cdot t\_id + 14 \cdot 80 \cdot f\_id + 14 \cdot 80 \cdot 8 \cdot ul\_(\text{carrier-}id) \quad [\text{Equation 2}]$$

Here, * represents a multiplication operation. s_id denotes a starting symbol index occupied by an RO on which the UE has transmitted the PRACH preamble. t_id denotes the index of a slot to which the RO on which the UE has transmitted the PRACH preamble belongs.

When the position of the RO for a higher SCS (e.g., 480/960 kHz) is configured and/or indicated to be within the OFDM symbol duration of the RO occupied by the reference SCS (e.g., 120 kHz), RA-RNTI may be derived based on Equation 2 by allowing the UE and the BS to reinterpreting the starting symbol index and slot index based on the reference SCS (e.g., 120 kHz) rather than the higher SCS (e.g., 480/960 kHz). The UE and the BS that need to calculate the RA-RNTI may reinterpret s_id and t_id, which are parameters for deriving the RA-RNTI based on the reference SCS (e.g., 120 kHz) even if the SCS of the RO on which the actual PRACH preamble is transmitted/received is configured as a higher SCS (e.g., 480/960 kHz). In other words, the values of s_id and t_id used in deriving the RA-RNTI may be values based on the reference SCS, not the values for the SCS actually applied to the RO on which the PRACH preamble is transmitted.

For example, referring to RO1 of FIG. 20, the actual starting symbol index and slot index of RO1 in the 480 kHz SCS are s_id=0 and t_id=4N, respectively. The starting symbol index and symbol index reinterpreted based on RO1 of the 120 kHz SCS (to be used for RA-RNTI derivation) are s_id=0 and t_id=N, respectively. Similarly, in 960 kHz SCS, the actual starting symbol index and slot index of RO1 are s_id=0 and t_id=8N, respectively, but the starting symbol index and slot index reinterpreted based on RO1 of 120 kHz SCS (to be used for RA-RNTI derivation) are s_id=0 and t_id=N, respectively.

As another example, for RO4 of FIG. 21, the actual starting symbol index and the slot index of RO4 in the 480 kHz SCS are s_id=2 and t_id=4N+2, respectively. The starting symbol index and slot index reinterpreted based on RO4 of 120 kHz SCS (to be used for RA-RNTI derivation) are s_id=6 and t_id=N, respectively. Similarly, in the 960 kHz SCS, the actual starting symbol index and slot index of RO4 are s_id=6 and t_id=8N+4, respectively. The starting symbol index and slot index reinterpreted based on RO4 of 120 kHz SCS (to be used for RA-RNTI derivation) are s_id=6 and t_id=N, respectively.

In addition, according to proposed method 1-C, when a timing gap is required between ROs, the timing gap natu-rally exists between ROs even if the BS does not additionally indicate an explicit timing gap. Therefore, proposed method 1-C may be used when the BS needs to configure/indicate a timing gap between ROs.

In other words, when the BS configures/indicates use of the inter-RO timing gap, proposed method 1-C may be used. When the BS configures/indicates disallowance of use of the inter-RO timing gap (or does not configure the inter-RO timing gap), another proposed method (e.g., proposed method 1, 1-A, or 1-B) by which the ROs may be consecutively mapped without a timing gap may be used.

Alternatively, two different RO mapping methods may be used together. For example, an RO mapping method such as proposed method 1-C in which the timing gap between ROs naturally exists may be used as one mapping type (e.g., RO mapping type 0), and an RO mapping method such as proposed method 1, 1-A, or 1-B in which there is no timing gap between ROs may be used as another mapping type (e.g., RO mapping type 1). When it is necessary to use the inter-RO timing gap, the BS may configure/indicate RO mapping type 0.

When it is not necessary to use the inter-RO timing gap, the BS may configure/indicate RO mapping type 1.

Alternatively, in the case where an explicit parameter for configuring a timing gap between ROs to be used is introduced (or the timing gap between ROs is indicated by an implicit method), when the BS indicates presence of a timing gap between ROs through the explicit parameter (or the implicit method), RO mapping type 0 may be used based thereon. In contrast, when the BS indicates absence of a timing gap between ROs through the explicit parameter (or the implicit method) (or when the explicit parameter is not transmitted to the UE), RO mapping type 1 may be used.

Alternatively, in the case where there is an explicit parameter indicating whether to perform the LBT procedure for the RACH procedure (or it is indicated whether to perform the LBT procedure using an implicit method), when the BS indicates, through the explicit parameter (or the implicit method), that the LBT procedure for the RACH procedure is to be performed, RO mapping type 0 may be used (because a timing gap is required between ROs at this time).

When the BS indicates, through the explicit parameter (or the implicit method), that the LBT procedure for the RACH procedure is not to be performed (or the explicit parameter is not transmitted to the UE), RO mapping type 1 may be used (because a timing gap is not required between the ROs).

[Proposed method 2: Defining a new reference SCS for FR4 and defining a RACH slot calculation method for new SCS values based on a conventional RACH slot calculation method]

When SCS to be used for FR4 is defined, one of the SCSs may be defined as a reference SCS. For example, when 240 kHz SCS is configured as the reference SCS for FR4, the RACH slot may be determined in 60 kHz and 120 kHz SCSs through a method defined for FR2. In addition, a new PRACH configuration table (or a method of reinterpreting the legacy PRACH configuration table) may be defined based on the 240 kHz SCS. A method of calculating the PRACH transmission occasion for 480 kHz and 960 kHz SCSs may be configured similarly to the method of FIG. 11 (the legacy method consisting of 60 kHz SCS and 120 kHz SCS).

First, a new PRACH configuration table (or the method of reinterpreting the legacy PRACH configuration table) is considered, the "Slot number" field in the legacy PRACH configuration table may be replaced with a new value, or may be reinterpreted as k times the existing value (e.g., k=240/60=4 when the 240 kHz SCS is configured as the reference SCS).

For example, when the PRACH config index is 70 as shown in FIG. 22, the 60 kHz SCS reference slot numbers are 19 and 39. Since k is 4, the slot numbers in the 240 kHz SCS may be 19*4=76 and 39*4=156. Accordingly, slot 76 and slot 156 may be selected as RACH slots based on the 240 kHz SCS.

Additionally, when k times the slot index is set, the PRACH transmission occasion is mapped to the first slot among the slots corresponding to the 60 kHz SCS reference slot.

Alternatively, additional slots may be configured as many as m slots after k times the slot index is set, where m E {0, 1, . . . , k−1}. When m is 0, the first slot among the 240 kHz SCS reference slots corresponding to the 60 kHz SCS reference slot may be configured as a RACH slot. When m is k−1, the last slot among the 240 kHz SCS reference slots corresponding to the 60 kHz SCS reference slot may be configured as a RACH slot. According to the example of FIG. 22, when m is 0, the slots with indexes 19*4=76 and 39*4=156 are RACH slots. When m is 1, the slots with indexes 19*4+1=77 and 39*4+1=157 become RACH slots. When m is 2, the slots with indexes 19*4+2=78 and 39*4+ 2=158 are RACH slots. When m is 3, the slots with indexes 19*4+3=79 and 39*4+3=159 are RACH slots.

The additional slot configuration value of m may be predefined so as to be pre-recognized by the UE and the BS. Also, the UE and the BS may pre-store the configuration of the value of m. Alternatively, the BS may indicate the same to the UE through higher layer signaling (e.g., SIB or dedicated RRC signaling). For example, the default value of m may be 0, and the BS may set one of values 1 to k−1 to the UE as the value of m. Specifically, the same value of m may be indicated in the first slot and the second slot, or different values of m may be independently set in the first slot and the second slot. The value of m for the first slot may be indicated by the BS, and the value of m for the second slot may be set according to a preconfigured rule (e.g., (m+1) mod k, or (m−1) mod k). Alternatively, the value of m for the second slot may be indicated by the BS, and the value of m for the first slot may be set according to the preconfigured rule (e.g., (m+1) mod k, or (m−1) mod k).

FIGS. 23 to 26 show examples of RACH slots configured by Method 2. The figures show examples of extension from 60 kHz SCS to 240 kHz SCS when k=4 and m is 0, 1, 2, and 3, respectively.

Additionally, when 240 kHz SCS is configured as the reference SCS, 480 kHz SCS may be reinterpreted by the UE according to the method of FIG. 11 (i.e., configuring a PRACH transmission occasion of 120 kHz SCS for 60 kHz SCS). For the 960 kHz SCS, other methods proposed herein (e.g., proposed methods 1 to 3) may be used.

With Method 2, the equation for configuring the PRACH configuration table and PRACH transmission occasion for the existing FR2 only needs to be slightly modified or a little reinterpretation method needs to be added.

[Proposed method 3: Increasing the density of the PRACH transmission occasion for SCS for FR4]

In the case of the 60 kHz SCS, a PRACH transmission occasion may be present in a single slot. In the case of 120 kHz SCS, a PRACH transmission occasion may be present in up to two slots. As such, for 240 kHz SCS, 480 kHz SCS, and 960 kHz SCS, PRACH transmission occasions may be configured in up to 4, 8, and 16 slots.

[Option 3-1] Configuring the Density of the PRACH Transmission Occasion to be Used to the Maximum Degree For example, in the case of 240 kHz SCS, a maximum of four configuration methods may be considered. That is, since up to four 240 kHz SCS slots may be present in a single slot duration of 60 kHz SCS, a configuration method using one slot to four slots as a PRACH transmission occasion may be used. The BS may indicate one of the four configuration methods to the UE (e.g., the previously defined parameter "Number of PRACH slots within a 60 kHz slot" may be indicated as one of 1 to 4), and the UE may configure a PRACH transmission occasion according to the indicated number of slots and then transmit a PRACH preamble. For example, when the number of slots indicated to the UE is 3, 3 slots up to the last slot (or 3 slots from the first slot) may be used for a PRACH transmission occasion.

Figure 27:
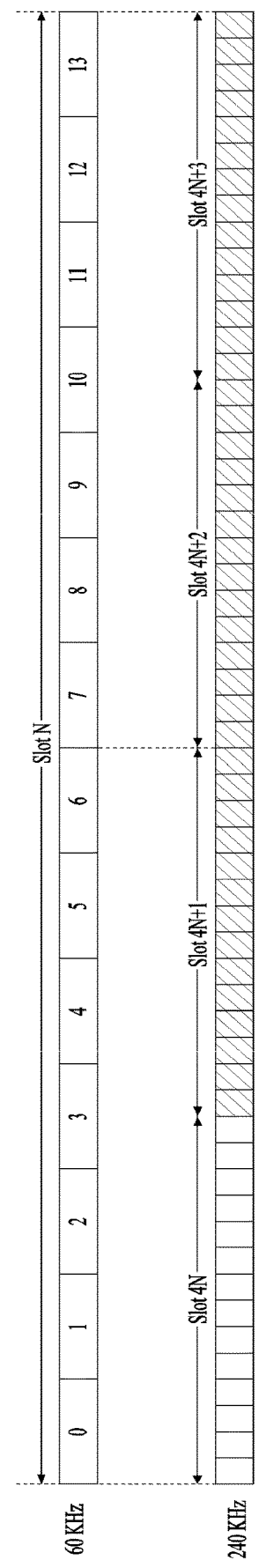

An example of option 3-1 is shown in FIG. 27. FIG. 27 shows an exemplary case where it is indicated that a PRACH transmission occasion is to be configured in of three slots up to the last slot in the 240 kHz SCS.

Additionally, in the case of 480 kHz SCS, a maximum of 8 configuration methods may be used. In the case of 960 kHz SCS, a maximum of 16 configuration methods may be used.

[Option 3-2] Increasing the Density of the PRACH Transmission Occasion, but Maintaining Two Configuration Methods (i.e., Using a Scale-Up Number of Slots)

For example, in the case of 240 kHz SCS, up to four 240 kHz SCS slots may be present in the single slot duration of 60 kHz SCS, and accordingly configuration methods of using one to four slots as the PRACH transmission occasion may be used. In this case, the UE and the BS may be pre-configured to use two pre-selected configuration methods among the four configuration methods, and the BS may indicate the two configuration methods to the UE (e.g., the previously defined parameter "Number of PRACH slots within a 60 kHz slot" may indicate one of two pre-selected numbers among 1 to 4). Additionally, the above two configuration methods may not be pre-selected. Instead, the BS may indicate the same to the UE through higher layer signaling (e.g., SIB or dedicated RRC signaling).

Thereafter, the UE may configure a PRACH transmission occasion according to the indicated number of slots and then transmit a PRACH preamble. For example, when the number of preselected slots is 2 or 4, and the number of slots indicated to the UE is 2, 2 slots up to the last slot (or 2 slots from the first slot) may be used for a PRACH transmission occasion.

Figure 28:
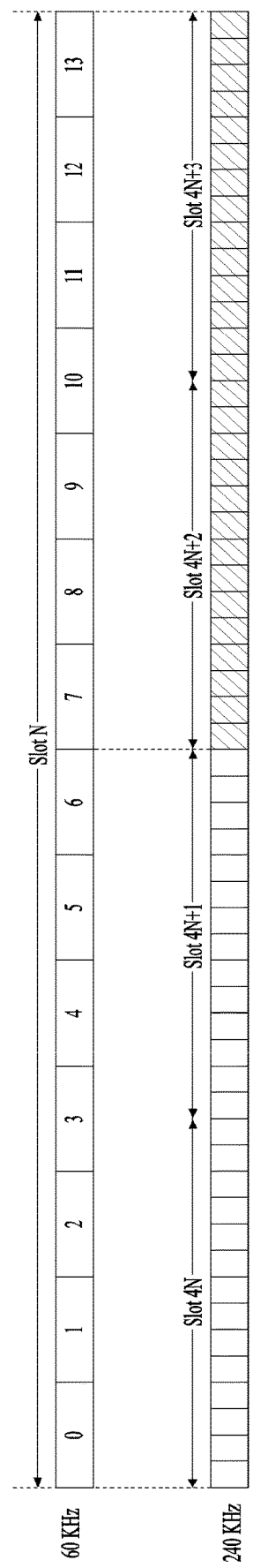
Figure 29:
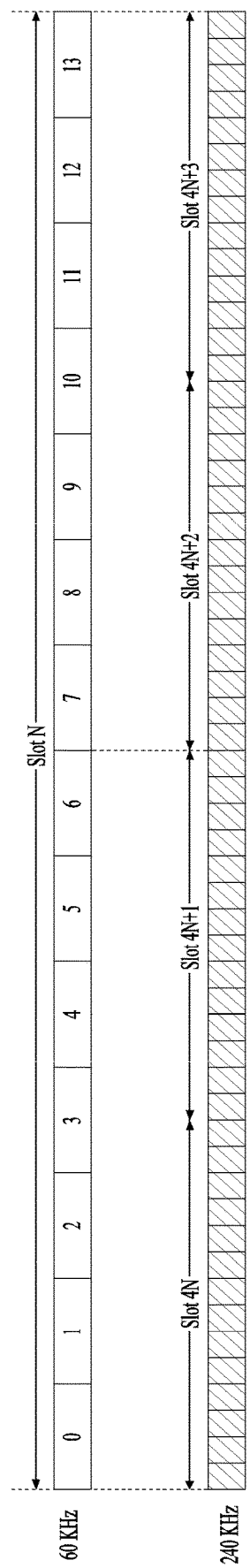

An example of option 3-2 is shown in FIGS. 28 and 29. FIGS. 28 and 29 represent two configuration methods set to two or four. FIG. 28 illustrates a case where a PRACH transmission occasion is indicated to be configured in a total of two slots up to the last slot in the 240 kHz SCS. FIG. 29 illustrates a case where a PRACH transmission occasion is indicated to be configured in a total of 4 slots up to the last slot in the 240 kHz SCS.

Additionally, in the case of 480 kHz SCS, two out of a maximum of 8 configuration methods may be used. In the case of 960 kHz SCS, two out of a maximum of 16 configuration methods may be used.

[Option 3-3] Configuring the Density of the PRACH Transmission Occasion and Configuration Methods by the BS Briefly, the BS may indicate, through higher layer signaling (e.g., SIB or dedicated RRC signaling), N configuration methods and even the number of slots indicated by each of the N configuration methods. For example, when N=2, there are a total of two configuration methods. The first configuration method (configuration method 3-3-1) is to configure a PRACH transmission occasion in X (consecutive) slots, and the second configuration method (configuration method 3-3-2) is to configure a PRACH transmission occasion in Y (consecutive) slots. Specifically, as many consecutive slots (up to the rear end) as the number of slots corresponding to X and Y may be configured as a PRACH transmission occasion. Alternatively, X or Y slots may be consecutive slots, but the BS may indicate a set of slots with a Z-slot gap between the slots (e.g., the previously defined parameter "Number of PRACH slots within a 60 kHz slot" may be set to X and Y, and then the X slots or Y slots up to the rear end among the slots overlapping the 60 kHz reference slot may be selected).

Figure 30:
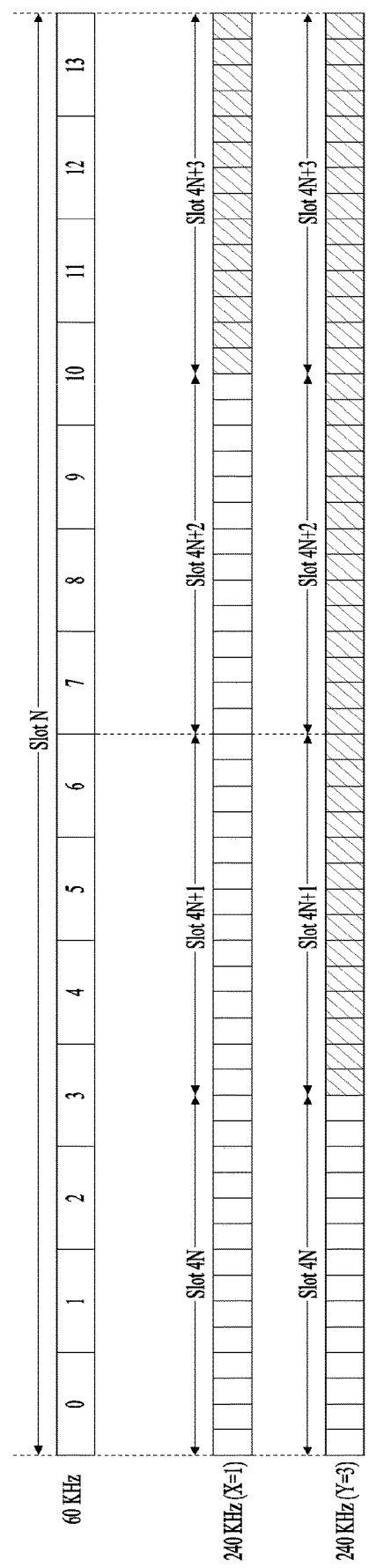

An example of option 3-3 is shown in FIG. 30. FIG. 30 shows a case where a PRACH transmission occasion is indicated to be configured in a total of X and Y slots up to the last slot in the 240 kHz SCS (e.g., X=1, Y=3)

It has been proposed that the positions of the RACH slots correspond to a specific number of slots (as consecutive slots or with a Z-slot gap therebetween) up to the rear end. The positions of the RACH slots may be configured in a method other than the method of configuring a specific number of slots up to the rear end. For example, when N=2, a PRACH transmission occasion may be configured in X slots up to the last slot according to a specific number (e.g., X) for configuration method 3-3-1, and then a PRACH transmission occasion may be configured in Y slots from the slot before the X slots according to a specific number (e.g., Y) for configuration method 3-3-2. With this configuration, X slots up to the last slot and Y slots thereafter may be used for PRACH transmission occasions.

Figure 31:
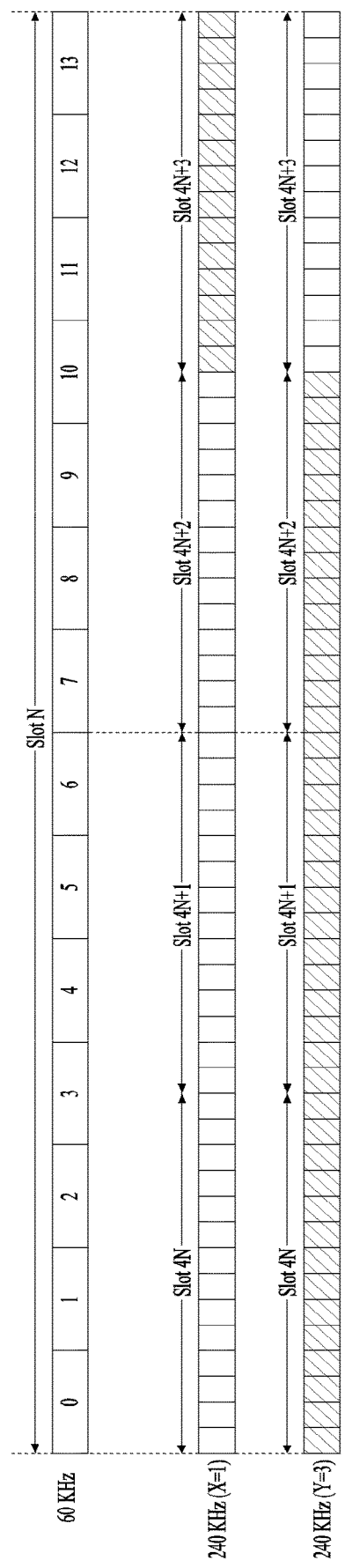

This configuration may be represented as shown in FIG. 31. FIG. 31 shows a case where it is indicated that a PRACH transmission occasion is to be configured in a total of X slots up to the last slot in the 240 kHz SCS, and a PRACH transmission occasion is to be configured in Y slots from the next slot before the X slots (e.g., X=1, Y=3).

As another example, when N=2, X slots up to the last slot as many as a specific number (e.g., X) for configuration method 3-3-1 may be used for a PRACH transmission occasion, and Y slots up to the last slot in which the 60 kHz SCS reference slot is divided in half, as many as a specific number (e.g., Y) for configuration method 3-3-2, may be used for a PRACH transmission occasion.

Figure 32:
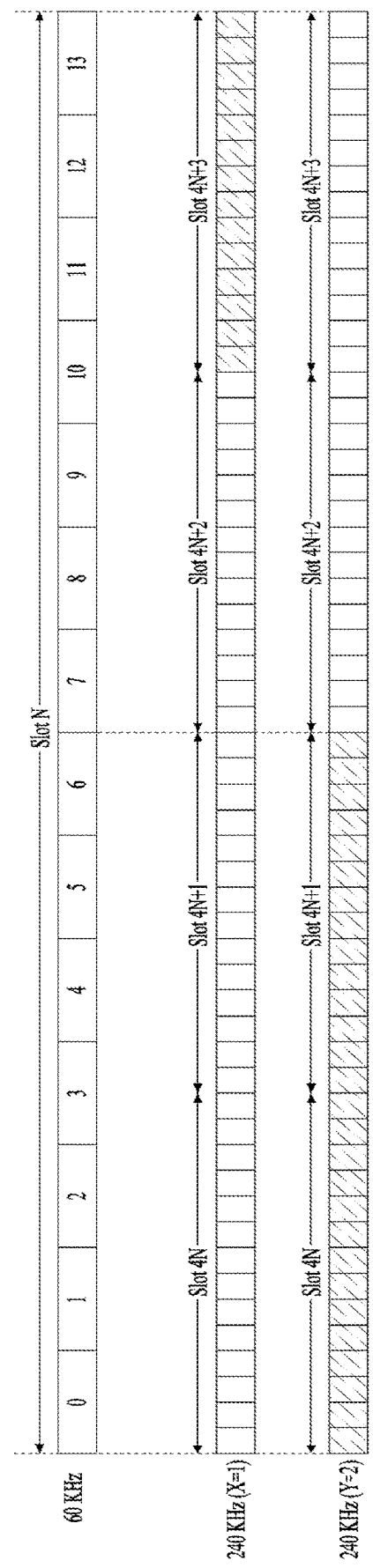

This configuration may be represented as shown in FIG. 32. FIG. 32 shows a case where it is indicated that a PRACH transmission occasion is to be configured in the X slots up to the last slot in the 240 kHz SCS, and a PRACH transmission occasion is to be configured in the Y slots up to the last slot in which the 60 kHz SCS reference slot is divided in half (e.g., X=1, Y=2).

Additionally, when slot groups corresponding to the respective configuration methods are not defined as they overlap in time as described above, a configuration method for selecting both slot groups may be added. As an example, when N=3, X slots up to the last slot as many as a specific number (e.g., X) for configuration method 3-3-1 may be used for a PRACH transmission occasion, and a PRACH transmission occasion may be configured in Y slots from the slot after the X slots as many as a specific number (e.g., Y) for configuration method 3-3-2. Finally, as a third configuration method (configuration method 3-3-3), slots corresponding to both X and Y may be configured for PRACH transmission occasions.

The above proposed methods may be used independently, or two or more of the proposed methods may be combined.

In addition, examples of the above-described proposed methods may also be included as one of the implementation methods of the present disclosure, and therefore it is apparent that they may be regarded as a kind of proposed methods. In addition, the above-described proposed methods may be implemented independently, or may be implemented by combining (or merging) some of the proposed methods. A rule may be defined such that the BS may provide the UE with information about whether the proposed methods are to be applied (or information about the rules of the proposed methods) through a predefined signal (e.g., a physical layer signal or a higher layer signal). The higher layer may include, for example, one or more of functional layers such as MAC, RLC, PDCP, RRC, and SDAP.

Implementation

Embodiments may be implemented by organically combining one or more of the operations described above.

One of the embodiments that may be implemented by a combination of the above-described operations may be configured as shown in FIG. 33.

The UE may transmit a PRACH (S3301) and receive a RAR corresponding to the PRACH (S3303). Although not shown, the BS may receive the PRACH and transmit the RAR corresponding to the PRACH.

A PRACH transmission occasion for the PRACH transmission may be determined by a combination of one or more of the operations described in proposed methods 1 to 3.

For example, according to proposed method 1, when the PRACH is transmitted based on one of the 480 kHz SCS and the 960 kHz SCS, the value for the PRACH slot used as the input value of Equation 1 may be reinterpreted as a first slot and a second slot, in place of 0 and 1 in FIG. 11.

Specifically, referring to proposed method 1 and FIG. 11, when the PRACH is transmitted based on one of the 480 kHz SCS and 960 kHz SCS, 60 kHz SCS is used for the reference slot (because the Number of PRACH slots is within a 60 kHz slot).

According to proposed method 1, based on one of the 480 kHz SCS and 960 kHz SCS being used for a slot in which the PRACH is transmitted, when the number of PRACH slots in the reference slot is 1 (the Number of PRACH slots within a 60 kHz slot is equal to 1), the value of 1 for the PRACH slot may be reinterpreted as a second slot value b. In proposed method 1, the second slot value b corresponds to the greatest value among 0 to N−1. Therefore, b corresponds to 7 in the 480 kHz SCS, and corresponds to 15 in the 960 kHz SCS.

Based on one of the 480 kHz SCS and 960 kHz SCS being used for the slot in which the PRACH is transmitted, when the number of PRACH slots in the reference slot is not 1 (otherwise, or the number is 2), 0 between 0 and 1, which are values for the PRACH slot, may be reinterpreted as a first slot value a, and 1 may be reinterpreted as a second slot values b. In proposed method 1, the second slot value b is the greatest value among 0 to N−1. Therefore b corresponds to 7 in the 480 kHz SCS, and corresponds to 15 in the 960 kHz SCS. In proposed method 1, when the first slot value a is N/2−1, b corresponds to 3 in the 480 kHz SCS, and corresponds to 7 in the 960 kHz SCS. An example of a modification of FIG. 11 presented considering that the first slot value a is N/2−1 is shown in FIG. 34. In proposed method 1, when the first slot value a is N−2, b corresponds to 6 in the 480 kHz SCS, and corresponds to 14 in the 960 kHz SCS. An example of a modification of FIG. 11 presented considering that the first slot value a is N−2 is shown in FIG. 35.

In other words, according to proposed method 1, based on the PRACH being transmitted in one or two PRACH slots for which one of the 480 kHz SCS and 960 kHz SCS is used, 60 kHz SCS may be used as the reference SCS for determining the PRACH slot(s). Accordingly, the one or two PRACH slots are determined among N slots corresponding to the 60 kHz reference slot. Since N is determined based on the ratio between the SCSs, N=8 for 480 kHz SCS and N=16 for 960 kHz SCS.

Referring to proposed method 1 and FIGS. 12, 13, 34, and 35, based on the number of PRACH slots in the reference slot being 1, one PRACH slot is used and a value for the PRACH slot is N−1. Also, based on the number of PRACH slots in the slot not being 1, two PRACH slots are used, and values for the PRACH slots may be N/2−1 and N−1. Also, based on the number of PRACH slots in the slot not being 1, two PRACH slots are used, and values for the PRACH slots may be N−2 and N−1.

In addition to the operation of FIG. 33 described above, one or more of the operations described with reference to FIGS. 1 to 32 and/or the operations described in section 3 may be combined and additionally performed.

Example of Communication System to which the Present Disclosure is Applied

The various descriptions, functions, procedures, proposals, methods, and/or operation flowcharts of the present disclosure described herein may be applied to, but not limited to, various fields requiring wireless communication/connectivity (e.g., 5G) between devices.

More specific examples will be described below with reference to the drawings. In the following drawings/description, like reference numerals denote the same or corresponding hardware blocks, software blocks, or function blocks, unless otherwise specified.

FIG. 35 illustrates a communication system 1 applied to the present disclosure.

Referring to FIG. 35, the communication system 1 applied to the present disclosure includes wireless devices, BSs, and a network. A wireless device is a device performing communication using radio access technology (RAT) (e.g., 5G NR (or New RAT) or LTE), also referred to as a communication/radio/5G device. The wireless devices may include, not limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of vehicle-to-vehicle (V2V) communication. Herein, the vehicles may include an unmanned aerial vehicle (UAV) (e.g., a drone). The XR device may include an augmented reality (AR)/virtual reality (VR)/mixed reality (MR) device and may be implemented in the form of a head-mounted device (HMID), a head-up display (HUD) mounted in a vehicle, a television (TV), a smartphone, a computer, a wearable device, a home appliance, a digital signage, a vehicle, a robot, and so on.

The hand-held device may include a smartphone, a smart pad, a wearable device (e.g., a smart watch or smart glasses), and a computer (e.g., a laptop). The home appliance may include a TV, a refrigerator, a washing machine, and so on. The IoT device may include a sensor, a smart meter, and so on. For example, the BSs and the network may be implemented as wireless devices, and a specific wireless device 200a may operate as a BS/network node for other wireless devices.

The wireless devices 100a to 100f may be connected to the network 300 via the BSs 200. An AI technology may be applied to the wireless devices 100a to 100f, and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without intervention of the BSs/network. For example, the vehicles 100b-1 and 100b-2 may perform direct communication (e.g., V2V/vehicle-to-everything (V2X) communication). The IoT device (e.g., a sensor) may perform direct communication with other IoT devices (e.g., sensors) or other wireless devices 100a to 100f.

Wireless communication/connections 150a, 150b, and 150c may be established between the wireless devices 100a to 100f/BS 200 and between the BSs 200. Herein, the wireless communication/connections may be established through various RATs (e.g., 5G NR) such as UL/DL communication 150a, sidelink communication 150b (or, D2D communication), or inter-BS communication (e.g., relay or integrated access backhaul (IAB)). Wireless signals may be transmitted and received between the wireless devices, between the wireless devices and the BSs, and between the BSs through the wireless communication/connections 150a, 150b, and 150c. For example, signals may be transmitted and receive don various physical channels through the wireless communication/connections 150a, 150b and 150c. To this end, at least a part of various configuration information configuring processes, various signal processing processes (e.g., channel encoding/decoding, modulation/demodulation, and resource mapping/demapping), and resource allocation processes, for transmitting/receiving wireless signals, may be performed based on the various proposals of the present disclosure.

Example of Wireless Device to which the Present Disclosure is Applied

FIG. 36 illustrates wireless devices applicable to the present disclosure.

Referring to FIG. 36, a first wireless device 100 and a second wireless device 200 may transmit wireless signals through a variety of RATs (e.g., LTE and NR). {The first wireless device 100 and the second wireless device 200} may correspond to {the wireless device 100x and the BS 200} and/or {the wireless device 100x and the wireless device 100x} of FIG. 35.

The first wireless device 100 may include one or more processors 102 and one or more memories 104, and further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operation flowcharts disclosed in this document. For example, the processor(s) 102 may process information in the memory(s) 104 to generate first information/signals and then transmit wireless signals including the first information/signals through the transceiver(s) 106. The processor(s) 102 may receive wireless signals including second information/signals through the transceiver(s) 106 and then store information obtained by processing the second information/signals in the memory(s) 104. The memory(s) 104 may be connected to the processor(s) 102 and may store various pieces of information related to operations of the processor(s) 102. For example, the memory(s) 104 may store software code including instructions for performing all or a part of processes controlled by the processor(s) 102 or for performing the descriptions, functions, procedures, proposals, methods, and/or operation flowcharts disclosed in this document. The processor(s) 102 and the memory(s) 104 may be a part of a communication modem/circuit/chip designed to implement RAT (e.g., LTE or NR). The transceiver(s) 106 may be connected to the processor(s) 102 and transmit and/or receive wireless signals through the one or more antennas 108. Each of the transceiver(s) 106 may include a transmitter and/or a receiver. The transceiver(s) 106 may be interchangeably used with radio frequency (RF) unit(s). In the present disclosure, the wireless device may be a communication modem/circuit/chip.

The second wireless device 200 may include one or more processors 202 and one or more memories 204, and further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operation flowcharts disclosed in this document. For example, the processor(s) 202 may process information in the memory(s) 204 to generate third information/signals and then transmit wireless signals including the third information/signals through the transceiver(s) 206. The processor(s) 202 may receive wireless signals including fourth information/signals through the transceiver(s) 106 and then store information obtained by processing the fourth information/signals in the memory(s) 204. The memory(s) 204 may be connected to the processor(s) 202 and store various pieces of information related to operations of the processor(s) 202. For example, the memory(s) 204 may store software code including instructions for performing all or a part of processes controlled by the processor(s) 202 or for performing the descriptions, functions, procedures, proposals, methods, and/or operation flowcharts disclosed in this document. The processor(s) 202 and the memory(s) 204 may be a part of a communication modem/circuit/chip designed to implement RAT (e.g., LTE or NR). The transceiver(s) 206 may be connected to the processor(s) 202 and transmit and/or receive wireless signals through the one or more antennas 208. Each of the transceiver(s) 206 may include a transmitter and/or a receiver. The transceiver(s) 206 may be interchangeably used with RF unit(s). In the present disclosure, the wireless device may be a communication modem/circuit/chip.

Now, hardware elements of the wireless devices 100 and 200 will be described in greater detail. One or more protocol layers may be implemented by, not limited to, one or more processors 102 and 202. For example, the one or more processors 102 and 202 may implement one or more layers (e.g., functional layers such as physical (PHY), medium access control (MAC), radio link control (RLC), packet data convergence protocol (PDCP), RRC, and service data adaptation protocol (SDAP)). The one or more processors 102 and 202 may generate one or more protocol data units (PDUs) and/or one or more service data Units (SDUs) according to the descriptions, functions, procedures, proposals, methods, and/or operation flowcharts disclosed in this document. The one or more processors 102 and 202 may generate messages, control information, data, or information according to the descriptions, functions, procedures, proposals, methods, and/or operation flowcharts disclosed in this document and provide the messages, control information, data, or information to one or more transceivers 106 and 206. The one or more processors 102 and 202 may generate signals (e.g., baseband signals) including PDUs, SDUs, messages, control information, data, or information according to the descriptions, functions, procedures, proposals, methods, and/or operation flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operation flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. For example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, proposals, methods, and/or operation flowcharts disclosed in this document may be implemented using firmware or software, and the firmware or software may be configured to include the modules, procedures, or functions. Firmware or software configured to perform the descriptions, functions, procedures, proposals, methods, and/or operation flowcharts disclosed in this document may be included in the one or more processors 102 and 202 or may be stored in the one or more memories 104 and 204 and executed by the one or more processors 102 and 202. The descriptions, functions, procedures, proposals, methods, and/or operation flowcharts disclosed in this document may be implemented using firmware or software in the form of code, an instruction, and/or a set of instructions.

The one or more memories 104 and 204 may be connected to the one or more processors 102 and 202 and store various types of data, signals, messages, information, programs, code, instructions, and/or commands. The one or more memories 104 and 204 may be configured to include read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or wireless signals/channels, mentioned in the methods and/or operation flowcharts of this document, to one or more other devices. The one or more transceivers 106 and 206 may receive user data, control information, and/or wireless signals/channels, mentioned in the descriptions, functions, procedures, proposals, methods, and/or operation flowcharts disclosed in this document, from one or more other devices. For example, the one or more transceivers 106 and 206 may be connected to the one or more processors 102 and 202 and transmit and receive wireless signals. For example, the one or more processors 102 and 202 may perform control so that the one or more transceivers 106 and 206 may transmit user data, control information, or wireless signals to one or more other devices. The one or more processors 102 and 202 may perform control so that the one or more transceivers 106 and 206 may receive user data, control information, or wireless signals from one or more other devices. The one or more transceivers 106 and 206 may be connected to the one or more antennas 108 and 208 and the one or more transceivers 106 and 206 may be configured to transmit and receive user data, control information, and/or wireless signals/channels, mentioned in the descriptions, functions, procedures, proposals, methods, and/or operation flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received wireless signals/channels from RF band signals into baseband signals in order to process received user data, control information, and wireless signals/channels using the one or more processors 102 and 202. The one or more transceivers 106 and 206 may convert the user data, control information, and wireless signals/channels processed using the one or more processors 102 and 202 from the baseband signals into the RF band signals. To this end, the one or more transceivers 106 and 206 may include (analog) oscillators and/or filters.

Example of Use of Wireless Device to which the Present Disclosure is Applied

Figure 37:
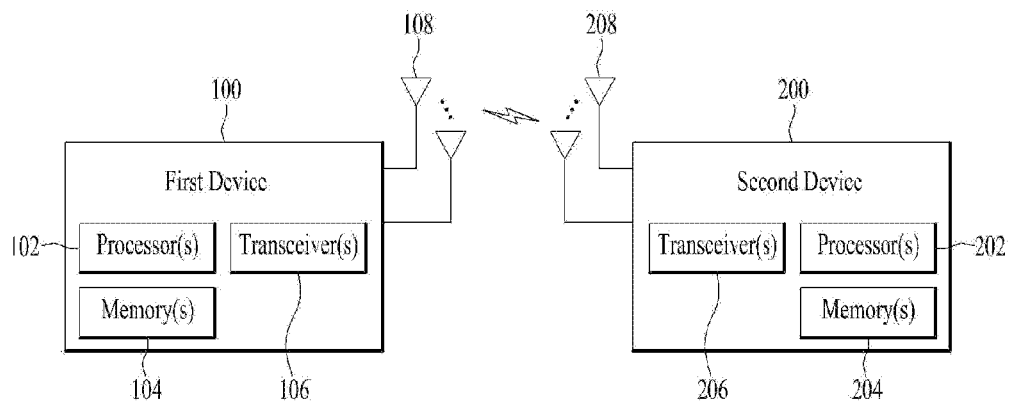

FIG. 37 illustrates another example of a wireless device applied to the present disclosure. The wireless device may be implemented in various forms according to a use case/service (refer to FIG. 35).

Referring to FIG. 37, wireless devices 100 and 200 may correspond to the wireless devices 100 and 200 of FIG. 36 and may be configured to include various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 and/or the one or more memories 104 and 204 of FIG. 36. For example, the transceiver(s) 114 may include the one or more transceivers 106 and 206 and/or the one or more antennas 108 and 208 of FIG. 36. The control unit 120 is electrically connected to the communication unit 110, the memory 130, and the additional components 140 and provides overall control to the wireless device. For example, the control unit 120 may control an electric/mechanical operation of the wireless device based on programs/code/instructions/information stored in the memory unit 130. The control unit 120 may transmit the information stored in the memory unit 130 to the outside (e.g., other communication devices) via the communication unit 110 through a wireless/wired interface or store, in the memory unit 130, information received through the wireless/wired interface from the outside (e.g., other communication devices) via the communication unit 110.

The additional components 140 may be configured in various manners according to type of the wireless device. For example, the additional components 140 may include at least one of a power unit/battery, input/output (I/O) unit, a driving unit, and a computing unit. The wireless device may be implemented in the form of, not limited to, the robot (100a of FIG. 35), the vehicles (100b-1 and 100b-2 of FIG. 35), the XR device (100c of FIG. 35), the hand-held device (100d of FIG. 35), the home appliance (100e of FIG. 35), the IoT device (100f of FIG. 35), a digital broadcasting terminal, a hologram device, a public safety device, an MTC device, a medical device, a FinTech device (or a finance device), a security device, a climate/environment device, the AI server/device (400 of FIG. 35), the BSs (200 of FIG. 35), a network node, or the like. The wireless device may be mobile or fixed according to a use case/service.

In FIG. 37, all of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module in the wireless devices 100 and 200 may further include one or more elements. For example, the control unit 120 may be configured with a set of one or more processors. For example, the control unit 120 may be configured with a set of a communication control processor, an application processor, an electronic control unit (ECU), a graphical processing unit, and a memory control processor. In another example, the memory 130 may be configured with a RAM, a dynamic RAM (DRAM), a ROM, a flash memory, a volatile memory, a non-volatile memory, and/or a combination thereof.

Figure 38:
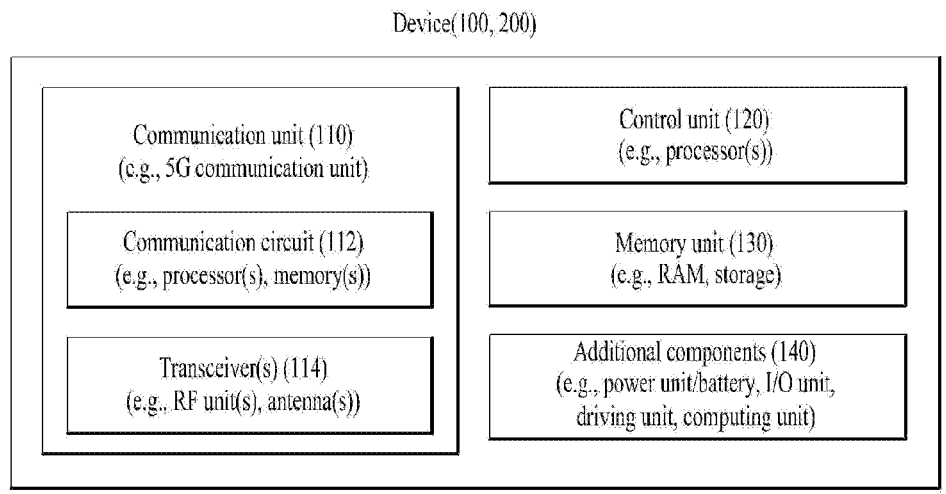
Figure 39:
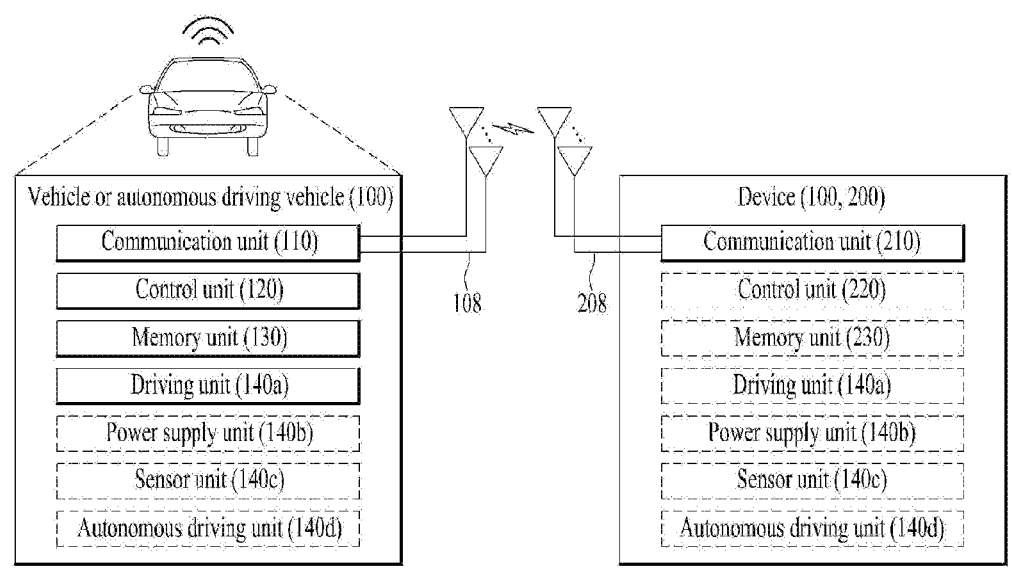

Example of Vehicle or Autonomous Driving Vehicle to which the Present Disclosure is Applied FIG. 38 illustrates a vehicle or an autonomous driving vehicle applied to the present disclosure. The vehicle or autonomous driving vehicle may be implemented as a mobile robot, a car, a train, a manned/unmanned aerial vehicle (AV), a ship, or the like.

Referring to FIG. 38, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 37, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an ECU. The driving unit 140a may enable the vehicle or the autonomous driving vehicle 100 to drive on a road. The driving unit 140a may include an engine, a motor, a powertrain, a wheel, a brake, a steering device, and so on. The power supply unit 140b may supply power to the vehicle or the autonomous driving vehicle 100 and include a wired/wireless charging circuit, a battery, and so on. The sensor unit 140c may acquire information about a vehicle state, ambient environment information, user information, and so on. The sensor unit 140c may include an inertial measurement unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, and so on. The autonomous driving unit 140d may implement technology for maintaining a lane on which the vehicle is driving, technology for automatically adjusting speed, such as adaptive cruise control, technology for autonomously driving along a determined path, technology for driving by automatically setting a route if a destination is set, and the like.

For example, the communication unit 110 may receive map data, traffic information data, and so on from an external server. The autonomous driving unit 140d may generate an autonomous driving route and a driving plan from the obtained data. The control unit 120 may control the driving unit 140a such that the vehicle or autonomous driving vehicle 100 may move along the autonomous driving route according to the driving plan (e.g., speed/direction control). During autonomous driving, the communication unit 110 may aperiodically/periodically acquire recent traffic information data from the external server and acquire surrounding traffic information data from neighboring vehicles. During autonomous driving, the sensor unit 140c may obtain information about a vehicle state and/or surrounding environment information. The autonomous driving unit 140d may update the autonomous driving route and the driving plan based on the newly obtained data/information. The communication unit 110 may transfer information about a vehicle position, the autonomous driving route, and/or the driving plan to the external server. The external server may predict traffic information data using AI technology based on the information collected from vehicles or autonomous driving vehicles and provide the predicted traffic information data to the vehicles or the autonomous driving vehicles.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

As described above, the present disclosure is applicable to various wireless communication systems.

The invention claimed is:

1. A method of transmitting and receiving a signal by a user equipment (UE) operating in a wireless communication system, the method comprising:
   transmitting a physical random access channel (PRACH); and
   receiving a random access response (RAR) based on the PRACH,
   wherein the PRACH is transmitted in one or two PRACH slots,
   wherein the one or two PRACH slots are determined among N slots corresponding to a reference slot,
   wherein, based on one of 480 kHz subcarrier spacing (SCS) and 960 kHz SCS being used for the N slots, 60 kHz SCS is used for the reference slot,
   wherein a number of PRACH slots in the reference slot is 1, a value for the one PRACH slot is N-1,
   wherein the number of PRACH slots in the reference slot is 2, values for the two PRACH slots are N/2-1 and N-1, and
   wherein the N is 8 for the 480 kHz SCS and the N is 16 for the 960 kHz SCS.

2. The method of claim 1, wherein the PRACH is transmitted on an interlace.

3. The method of claim 1, wherein the PRACH is transmitted through a shared spectrum.

4. The method of claim 1, wherein the PRACH is transmitted in a frequency band equal to or larger than 52.6 GHz.

5. A user equipment (UE) configured to transmit and receive a signal in a wireless communication system, the UE comprising:
   at least one transceiver;
   at least one processor; and
   at least one memory operably connected to the at least one processor and configured to store instructions that, when executed, cause the at least one processor to perform operations comprising:
   transmitting a physical random access channel (PRACH); and
   receiving a random access response (RAR) based on the PRACH,
   wherein the PRACH is transmitted in one or two PRACH slots,
   wherein the one or two PRACH slots are determined among N slots corresponding to a reference slot,
   wherein, based on one of 480 kHz subcarrier spacing (SCS) and 960 kHz SCS being used for the N slots, 60 kHz SCS is used for the reference slot,
   wherein a number of PRACH slots in the reference slot is 1, a value for the one PRACH slot is N-1,
   wherein the number of PRACH slots in the reference slot is 2, values for the two PRACH slots are N/2-1 and N-1, and
   wherein the N is 8 for the 480 kHz SCS and the N is 16 for the 960 KHz SCS.

6. The UE of claim 5, wherein the PRACH is transmitted on an interlace.

7. The UE of claim 5, wherein the PRACH is transmitted through a shared spectrum.

8. The UE of claim 5. wherein the PRACH is transmitted in a frequency band equal to or larger than 52.6 GHz.

9. A method of transmitting and receiving a signal by a base station (BS) operating in a wireless communication system, the method comprising:
   receiving a physical random access channel (PRACH); and
   transmitting a random access response (RAR) based on the PRACH,
   wherein the PRACH is transmitted in one or two PRACH slots,
   wherein the one or two PRACH slots are determined among N slots corresponding to a reference slot,
   wherein, based on one of 480 kHz subcarrier spacing (SCS) and 960 kHz SCS being used for the N slots, 60 kHz SCS is used for the reference slot,
   wherein a number of PRACH slots in the reference slot is 1, a value for the one PRACH slot is N-1,
   wherein the number of PRACH slots in the reference slot is 2, values for the two PRACH slots are N/2-1 and N-1, and
   wherein the N is 8 for the 480 kHz SCS and the N is 16 for the 960 KHz SCS.

10. The method of claim 9, wherein the PRACH is received on an interlace.

11. The method of claim 9, wherein the PRACH is received through a shared spectrum.

12. The method of claim 9, wherein the PRACH is received in a frequency band equal to or larger than 52.6 GHz.

13. A base station (BS) configured to transmit and receive a signal in a wireless communication system, the BS comprising:
- at least one transceiver;
- at least one processor; and
- at least one memory operably connected to the at least one processor and configured to store instructions that, when executed, cause the at least one processor to perform operations comprising:
- receiving a physical random access channel (PRACH); and
- transmitting a random access response (RAR) based on the PRACH,
- wherein the PRACH is transmitted in one or two PRACH slots,
- wherein the one or two PRACH slots are determined among N slots corresponding to a reference slot,
- wherein, based on one of 480 kHz subcarrier spacing (SCS) and 960 kHz SCS being used for the N slots, 60 kHz SCS is used for the reference slot,
- wherein a number of PRACH slots in the reference slot is 1, a value for the one PRACH slot is N-1,
- wherein the number of PRACH slots in the reference slot is 2, values for the two PRACH slots are N/2-1 and N-1, and
- wherein the N is 8 for the 480 kHz SCS and the N is 16 for the 960 kHz SCS.

14. The BS of claim 13, wherein the PRACH is received on an interlace.

15. The BS of claim 13, wherein the PRACH is received through a shared spectrum.

16. The BS of claim 13, wherein the PRACH is received in a frequency band equal to or larger than 52.6 GHz.

* * * * *